(12) United States Patent
Takei et al.

(10) Patent No.: US 11,228,034 B2
(45) Date of Patent: Jan. 18, 2022

(54) POSITIVE ACTIVE MATERIAL FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Yuki Takei, Yokohama (JP); Masatsugu Nakano, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 479 days.

(21) Appl. No.: 14/961,686

(22) Filed: Dec. 7, 2015

(65) Prior Publication Data

US 2016/0164094 A1 Jun. 9, 2016

(30) Foreign Application Priority Data

Dec. 9, 2014 (JP) .............................. JP2014-248598
Oct. 7, 2015 (KR) ........................ 10-2015-0140980

(51) Int. Cl.
  *H01M 4/525* (2010.01)
  *H01M 10/0525* (2010.01)
  (Continued)

(52) U.S. Cl.
  CPC ............ *H01M 4/525* (2013.01); *C01G 53/42* (2013.01); *C01G 53/50* (2013.01); *H01M 4/505* (2013.01);
  (Continued)

(58) Field of Classification Search
  CPC .. H01M 4/525; H01M 4/505; H01M 10/0525; C01G 53/42; C01G 53/50
  See application file for complete search history.

(56) References Cited

U.S. PATENT DOCUMENTS 5,720,932 A 2/1998 Amine et al.
6,241,959 B1 6/2001 Cho et al.
(Continued)

FOREIGN PATENT DOCUMENTS

CN 1208249 C 6/2005
CN 101030639 * 7/2011
(Continued)

OTHER PUBLICATIONS

C.H. Chen, J. Liu, M.E. Stoll, G. Henriksen, D.R. Vissers, K. Amine; Aluminum-doped lithium nickel cobalt oxide electrodes for high-power lithium-ion batteries; Journal of Power Sources 128 (2004) 278-285 (Year: 2004).*

(Continued)

*Primary Examiner* — Ula C Ruddock
*Assistant Examiner* — Thomas H. Parsons
(74) *Attorney, Agent, or Firm* — Lewis Roca Rothgerber Christie LLP

(57) ABSTRACT

A positive active material for a rechargeable lithium battery includes a lithium nickel composite oxide having an $I_{(003)}/I_{(104)}$ ratio of greater than or equal to about 0.92 and less than or equal to about 1.02 in X-ray diffraction, wherein the $I_{(003)}/I_{(104)}$ ratio is a ratio of a diffraction peak intensity $I_{(003)}$ of a (003) phase and a diffraction peak intensity $I_{(104)}$ of a (104) phase. The lithium nickel composite oxide includes lithium and a nickel-containing metal, and nickel is present in an amount of greater than or equal to about 80 atm % based on the total atom amount of the nickel-containing metal. A rechargeable lithium battery includes the positive active material.

12 Claims, 15 Drawing Sheets

(51) Int. Cl.
- *H01M 4/505* (2010.01)
- *C01G 53/00* (2006.01)
- *H01M 10/052* (2010.01)
- *H01M 4/131* (2010.01)

(52) U.S. Cl.
CPC ..... *H01M 10/0525* (2013.01); *C01P 2002/50* (2013.01); *C01P 2002/52* (2013.01); *C01P 2002/72* (2013.01); *C01P 2002/74* (2013.01); *C01P 2004/61* (2013.01); *H01M 4/131* (2013.01); *H01M 10/052* (2013.01)

(56) References Cited

U.S. PATENT DOCUMENTS

| | | | |
|---|---|---|---|
| 6,773,852 B2 * | 8/2004 | Cho | H01M 4/1391 |
| | | | 429/231.3 |
| 2003/0228519 A1 * | 12/2003 | Nakura | H01M 4/505 |
| | | | 429/223 |

FOREIGN PATENT DOCUMENTS

| | | | |
|---|---|---|---|
| EP | 1372202 | A1 | 12/2003 |
| EP | 1 372 202 | B1 | 11/2013 |
| JP | 8-22826 | A | 1/1996 |
| JP | 08022826 | * | 1/1996 |
| JP | 08022826 | A * | 1/1996 |
| JP | 10-172564 | A | 6/1998 |
| JP | 10-321224 | A | 12/1998 |
| JP | 10321224 | * | 12/1998 |
| JP | 10321224 | A * | 12/1998 |
| JP | 2000-195514 | A | 7/2000 |
| JP | 2000-294240 | | 10/2000 |
| JP | 2009-64702 | A | 3/2009 |
| JP | 4320548 | B2 | 6/2009 |

OTHER PUBLICATIONS

Fujita, et al., "$LiNi_{1-x}Co_xO_2$ prepared at low temperature using beta-$Ni_{1-x}Co_x$ OOH and either $LiNO_3$ or LiOH," Journal of Power Sources, vol. 68, 1997, pp. 126-130.

EPO Extended Search Report dated Sep. 20, 2016, for corresponding European Patent Application No. 15198701.3 (15 pages).
Abstract and English Machine Translation of Japanese Patent Publication No. 10-172564 A, Jun. 26, 1998, 13 Pages.
Abstract and English Machine Translation of Japanese Patent Publication No. 2000-195514 A, Jul. 14, 2000, 19 Pages.
EPO Search Report dated Apr. 14, 2016, for corresponding European Patent application 15198701.3, (9 pages).
English machine translation for Japanese Publication 2000-294240 dated Oct. 20, 2000, listed above, (13 pages).
Li, D., et al., *Synthesis and electrochemical properties of $LiNi_{0.85-x}Co_xMn_{0.15}O_2$ as cathode materials for lithium-ion batteries*, Journal Of Solid State Electrochemistry, vol. 12, No. 3, Aug. 11, 2007, pp. 323-327, XP055254058.
Song, M., et al., *Synthesis of $LiNiO_2$ cathode by the combustion method*, Journal Of Applied Electrochemistry, vol. 36, No. 7, May 9, 2006, pp. 801-805, XP019397985.
Japanese Office Action dated Aug. 21, 2018, for corresponding Japanese Patent Application No. 2014-248598 (2 pages).
Chinese Notification of the First Office Action dated Aug. 28, 2019, including Search Report dated Aug. 20, 2019, for Patent Application No. 201510907093.0, 9 pages.
English Translation of Chinese Notification of the First Office Action dated Aug. 28, 2019, including Search Report dated Aug. 20, 2019, for Patent Application No. 201510907093.0, 10 pages.
Chinese Intellectual Property Office Action dated Jun. 28, 2020, and accompanying Search Report dated Jun. 17, 2020, with English Translation for corresponding Chinese Patent Application No. 201510907093.0, 21 pages.
Chinese Intellectual Property Office Action dated Dec. 1, 2020, and accompanying Search Report dated Nov. 20, 2020, with English Translation, for corresponding Chinese Patent Application No. 201510907093.0, 23 pages.
The Decision of Final Rejection of the Application in the Corresponding Chinese Patent Application No. 201510907093.0, with Machine English Translation, dated Mar. 17, 2021, 18 Pages.

* cited by examiner

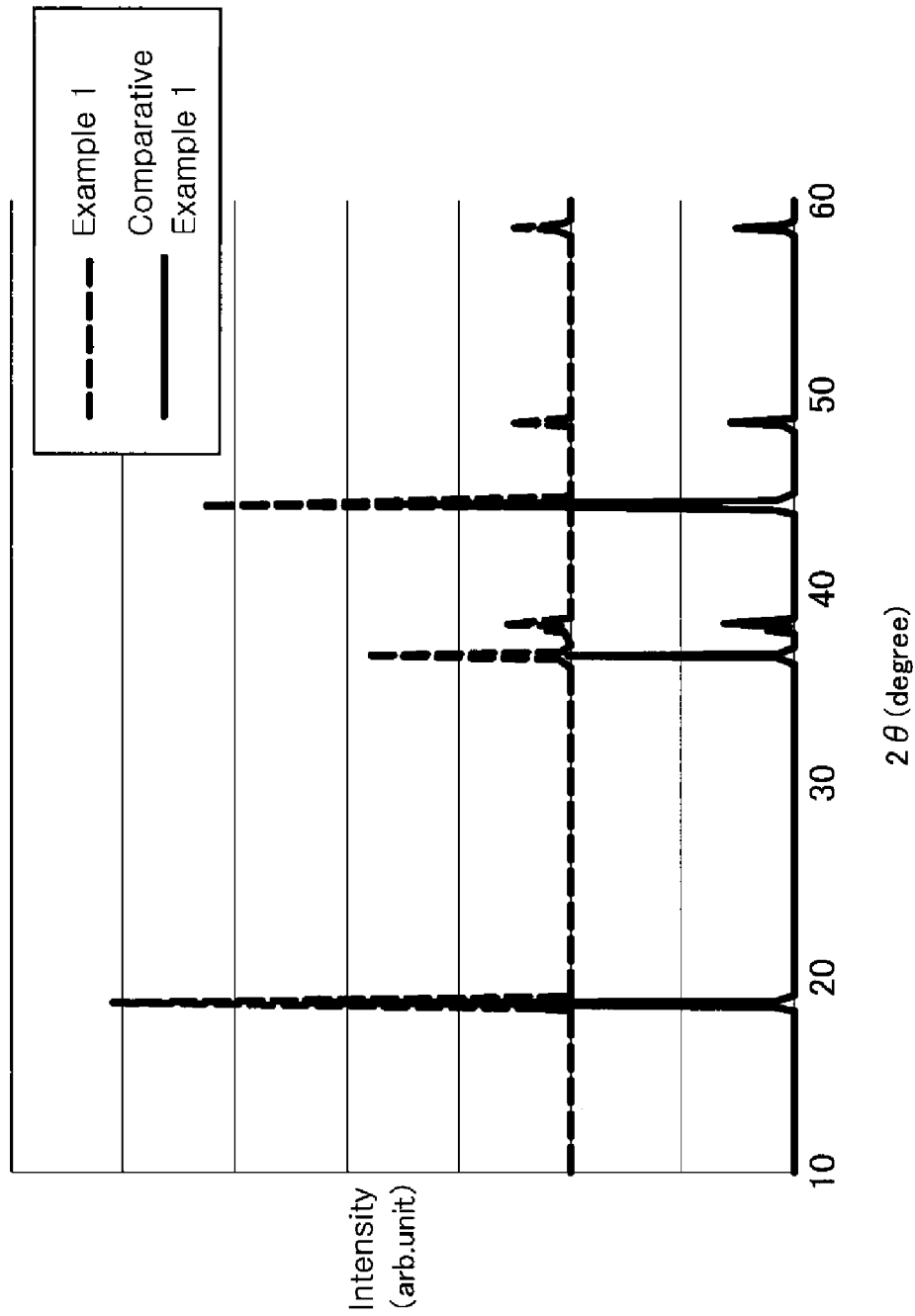

POSITIVE ACTIVE MATERIAL FOR RECHARGEABLE LITHIUM BATTERY AND RECHARGEABLE LITHIUM BATTERY

CROSS-REFERENCED TO RELATED APPLICATIONS

This application claims priority to and the benefit of Japanese Patent Application No. 2014-248598, filed in the Japan Patent Office on Dec. 9, 2014; and Korean Patent Application No. 10-2015-0140980, filed in the Korean Intellectual Property Office on Oct. 7, 2015, the entire contents of both are incorporated herein by reference.

BACKGROUND

1. Field

A positive active material for a rechargeable lithium battery and a rechargeable lithium battery including the same are disclosed.

2. Description of the Related Art

Recently, a lithium nickel composite oxide including nickel has been suggested as a positive active material capable of realizing a high potential and high capacity in a rechargeable lithium ion battery.

However, when the lithium nickel composite oxide includes Ni in a higher ratio, Ni on the surface thereof is more oxidized (e.g., more Ni on the surface thereof is oxidized) as the charge and discharge cycles are repeated, and forms a rock salt-like structure (for example, NiO and/or the like) more easily that does not contribute to the intercalation and deintercalation of Li. Accordingly, a rechargeable lithium ion battery utilizing this lithium nickel composite oxide as a positive active material has a problem of low cycle characteristics.

SUMMARY

An aspect according to one or more embodiments of the present invention is directed toward a positive active material for a rechargeable lithium battery suppressed from forming the rock salt-like structure that does not contribute to the intercalation and deintercalation of Li, and thereby providing improved cycle characteristics of the rechargeable lithium battery.

Another aspect according to one or more embodiments of the present invention is directed toward a rechargeable lithium battery including the positive active material.

According to one embodiment, a positive active material for a rechargeable lithium battery includes a lithium nickel composite oxide having an $I_{(003)}/I_{(104)}$ ratio of greater than or equal to about 0.92 and less than or equal to about 1.02, wherein the $I_{(003)}/I_{(104)}$ ratio is a ratio of a diffraction peak intensity $I_{(003)}$ of a (003) phase and a diffraction peak intensity $I_{(104)}$ of a (104) phase in X-ray diffraction, wherein the lithium nickel composite oxide includes lithium and a nickel-containing metal, and nickel is present in an amount of greater than or equal to about 80 atm % based on a total atom amount of the nickel-containing metal.

The lithium nickel composite oxide may be represented by Chemical Formula 1.

   Chemical Formula 1

In Chemical Formula 1, M is at least one metal selected from aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce), $0.2 \leq a \leq 1.2$, $0.8 \leq x < 1$, $0 < y \leq 0.2$, $0 \leq z \leq 0.1$, and $x+y+z=1$.

In Chemical Formula 1, x may be in a range of $0.85 \leq x < 1$.

An average particle diameter of a secondary particle of the lithium nickel composite oxide may be greater than or equal to about 8 μm and less than or equal to about 25 μm.

The lithium nickel composite oxide may be obtained by firing a lithium nickel composite oxide precursor at an oxygen partial pressure of greater than about 0.1 MPa and less than about 0.5 MPa.

A full width at half maximum $FWHM_{(003)}$ of a diffraction peak of the (003) phase of the lithium nickel composite oxide in X-ray diffraction may be greater than or equal to about 0.13 and less than or equal to about 0.15.

A full width at half maximum $FWHM_{(104)}$ of a diffraction peak of the (104) phase of the lithium nickel composite oxide in X-ray diffraction may be greater than or equal to about 0.15 and less than or equal to about 0.18.

The lithium nickel composite oxide may have an average transition metal valence of greater than or equal to about 2.9 calculated from an analysis of an X-ray absorption fine structure (XAFS) or a carbon, hydrogen, nitrogen, oxygen (CHNO) elemental analysis.

According to another embodiment, a rechargeable lithium battery includes a positive electrode including the positive active material.

Other embodiments are included in the following detailed description.

Cycle characteristics of a rechargeable lithium battery may be improved.

BRIEF DESCRIPTION OF THE DRAWINGS

FIG. 2A is a graph showing the X-ray diffraction analysis of positive active materials according to Example 1 and Comparative Example 1.

DETAILED DESCRIPTION

Hereinafter, embodiments are described in more detail. However, these embodiments are exemplary, and this disclosure is not limited thereto. Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, or 35 U.S.C. § 112(a), and 35 U.S.C. § 132(a).

Hereinafter, a rechargeable lithium battery according to one embodiment is described referring to FIG. 1.

Figure 1:
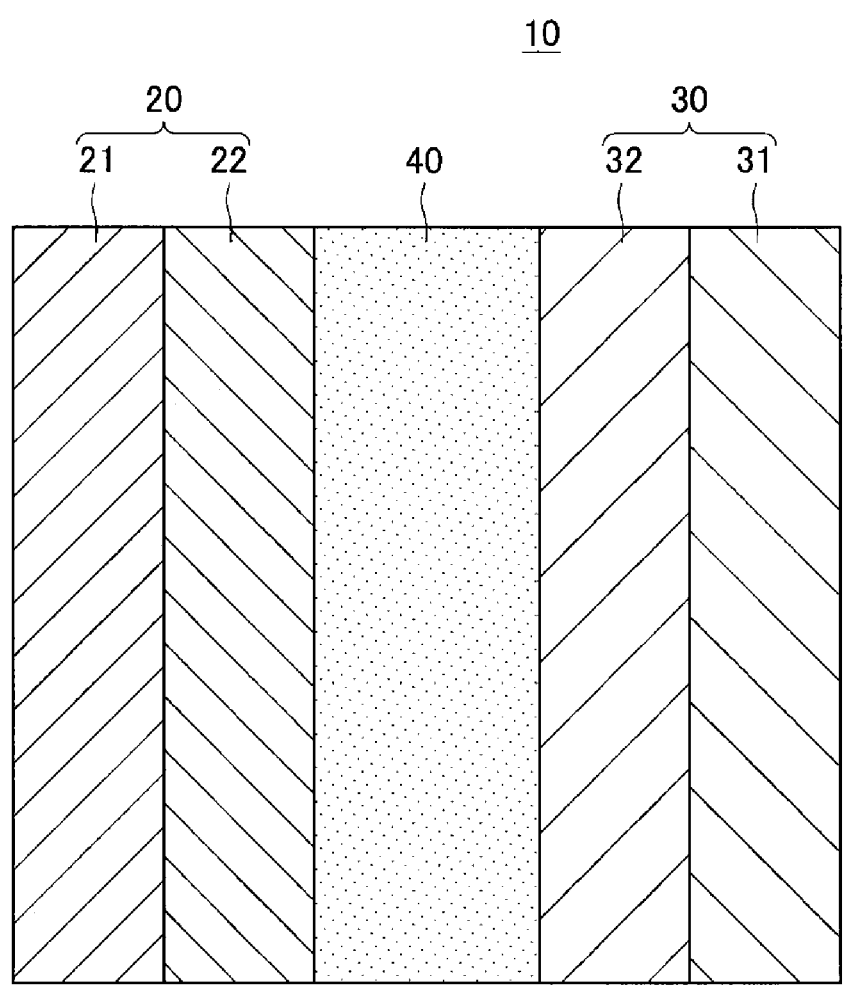
FIG. 1 is a cross-sectional view showing a schematic structure of a rechargeable lithium battery according to one embodiment.

FIG. 1 is a cross-sectional view showing a schematic structure of a rechargeable lithium battery according to one embodiment.

Referring to FIG. 1, a rechargeable lithium battery 10 includes a positive electrode 20, a negative electrode 30, and a separator layer 40. The rechargeable lithium ion battery 10 is not particularly limited in shape, and may have any suitable shape such as a cylinder, a prism, a laminate shape, a button shape, and/or the like.

The positive electrode 20 includes a current collector 21 and a positive active material layer 22 formed on the current collector 21.

The current collector 21 may be any suitable conductor, for example, aluminum (Al), stainless steel, nickel-plated steel, and/or the like.

The positive active material layer 22 includes a positive active material, and may further include at least one selected from a conductive material and a binder.

Contents of the positive active material, the conductive material, and the binder are not particularly limited, and may be any suitable content applicable to a general rechargeable lithium battery.

Hereinafter, the positive active material is described.

The positive active material may include a lithium nickel composite oxide.

The lithium nickel composite oxide has the following parameters within respective set or predetermined ranges: an $I_{(003)}/I_{(104)}$ ratio between a diffraction peak intensity $I_{(003)}$ of a (003) phase and a diffraction peak intensity $I_{(104)}$ of a (104) phase in X-ray diffraction; a full width at half maximum $FWHM_{(003)}$ of a diffraction peak of a (003) phase; a full width of half maximum $FWHM_{(104)}$ of a diffraction peak of a (104) phase; and an average valence of the transition metal. The lithium nickel composite oxide improves the cycle characteristics of a rechargeable lithium battery.

For example, the $I_{(003)}/I_{(104)}$ ratio between a diffraction peak intensity $I_{(003)}$ of a (003) phase and a diffraction peak intensity $I_{(104)}$ of a (104) phase in X-ray diffraction may be greater than or equal to about 0.92 and less than or equal to about 1.02, for example, greater than or equal to about 0.93 and less than or equal to about 1.01. When the $I_{(003)}/I_{(104)}$ ratio between the diffraction peak intensities of the (003) phase and the (104) phases falls within these ranges, the discharge capacity of a rechargeable lithium battery increases and cycle characteristics are improved.

The full width at half maximum $FWHM_{(003)}$ of a diffraction peak of a (003) phase in X-ray diffraction may be greater than or equal to about 0.13 and less than or equal to about 0.15, for example, greater than or equal to about 0.130 and less than or equal to about 1.145. When the full width at half maximum $FWHM_{(003)}$ of a diffraction peak of a (003) phase is within these ranges, discharge capacity of a rechargeable lithium battery increases and cycle characteristics may be improved.

The full width at half maximum $FWHM_{(104)}$ of a diffraction peak of a (104) phase in X-ray diffraction may be greater than or equal to about 0.15 and less than or equal to about 0.18, for example, greater than or equal to about 0.152 and less than or equal to about 0.178. When the full width at half maximum $FWHM_{(104)}$ of a diffraction peak of a (104) phase is within these ranges, discharge capacity of a rechargeable lithium battery increases and cycle characteristics may be improved.

The diffraction peak intensity ratio $I_{(003)}/I_{(104)}$, the full width at half maximum $FWHM_{(003)}$ of a diffraction peak of a (003) phase and the full width at half maximum $FWHM_{(104)}$ of a diffraction peak of a (104) phase may be, for example, obtained from an X-ray diffraction pattern of a lithium nickel composite oxide.

The X-ray diffraction pattern of the lithium nickel composite oxide may be, for example, obtained by a known X-ray diffraction measurement method.

The lithium nickel composite oxide may be represented as $LiMeO_2$ (Me represents transition metals including nickel). An average valence of the transition metals of the lithium nickel composite oxide (e.g., an average valence of Me when all transition metals are represented as a single transition metal Me despite the number of transition metals included in the lithium nickel composite) according to one embodiment may be greater than or equal to about 2.9 (for example, greater than or equal to about 2.90), and less than or equal to about 3. When the average valence of the transition metals falls within the above described range, cycle characteristics of a rechargeable lithium battery may be improved.

The average valence of the transition metals of the lithium nickel composite oxide may be, for example, calculated from the oxygen content by a carbon, hydrogen, nitrogen, oxygen (CHNO) inorganic elemental analysis for a lithium nickel composite oxide.

For example, the number of moles of each metal element (the lithium element and the transition metal element including nickel) included in the lithium nickel composite oxide is obtained through ICP (Inductively Coupled Plasma) elemental analysis and/or the like. As twice the obtained total number of moles of transition metal elements (e.g., nickel and any other transition metals included in the lithium nickel composite oxide, excluding lithium) is the theoretical number of moles of oxygen, when it is corresponded to the moles of oxygen (e.g., when the moles of oxygen is obtained by doubling the total number of moles of the transition metal elements), the composition formula of the lithium nickel composite oxide may be obtained by utilizing the number of moles of lithium, transition metals, and oxygen. An oxygen content (e.g., a weight percentage of oxygen in the lithium nickel composite oxide) may be obtained from the composition formula (e.g., by calculating the weight of each of Li, nickel, oxygen and any other transition metals in one mole of the lithium nickel composite oxide) and is regarded as (represented by) A wt %. In other words, the A wt % is the theoretical value of the oxygen content (e.g., the theoretical weight percentage of oxygen in one mole of the lithium nickel composite oxide based on the total weight of the lithium nickel composite oxide).

Subsequently, the oxygen content obtained through a CHNO inorganic elemental analysis is regarded as (represented by) B wt %. In other words, the B wt % is an actual value of the oxygen content.

Herein, since the lithium nickel composite oxide is represented as $LiMeO_2$ (Me is a transition metal), the average valence of transition metals (represented by Me) has a theoretical value of +3, when lithium (Li) is regarded to have a valence of +1, while oxygen (O) is regarded to have a valence of −2. As the ratio between the amount the oxygen and the amount of the transition metals is substantially constant, the actual value of the average valence of transition metals included in the lithium nickel composite oxide may be obtained by multiplying a ratio of the theoretical value A wt % and the actual value B wt % of the oxygen content by the theoretical value 3 of the average valence of transition metals.

In other words, the actual value of the average valence of transition metals may be calculated through the following Equation 1.

$$\text{Average valence of transition metal} = [B(\text{wt \%})/A(\text{wt \%})] \times 3 \quad \text{Equation 1}$$

In addition, the average valence of transition metals included in the lithium nickel composite oxide may be calculated, for example, through an X-ray absorption fine structure (XAFS).

The lithium nickel composite oxide according to one embodiment may be manufactured by firing (heat-treating) a lithium nickel composite oxide precursor under an oxygen partial pressure ranging from greater than about 0.1 MPa to less than about 0.5 MPa.

When the lithium nickel composite oxide precursor is fired (heat-treated) within the above described oxygen partial pressure range, the lithium nickel composite oxide may be suppressed from having crystal growth (e.g., suppressed from having excessive crystal growth). Accordingly, the lithium nickel composite oxide may be manufactured under a high lithium and temperature (e.g., high temperature) condition in which a crystal easily grows.

This high lithium and temperature (e.g., high temperature) condition in the related art makes it excessively easily for a crystal to grow and thus deteriorates the characteristics of a rechargeable lithium battery due to rapid crystal growth or excessively high crystallinity.

Herein, the high lithium condition refers to, for example, a condition in which Li has a mole ratio of 1 or more relative to the transition metal elements except for Li in the lithium nickel composite oxide precursor. In addition, the high temperature condition refers to, for example, a condition in which the lithium nickel composite oxide precursor is fired at a temperature ranging from greater than or equal to about 750° C. to less than or equal to about 850° C.

In the lithium nickel composite oxide according to one embodiment, the firing of its precursor under a high oxygen partial pressure and under a high lithium and temperature condition may control the crystal growing speed of the lithium nickel composite oxide and promote solid dissolution of Li with other elements (such as nickel and/or the like except for Li). Accordingly, stability of the lithium nickel composite oxide may be much improved.

In addition, the lithium nickel composite oxide according to one embodiment reacts with moisture or carbon dioxide in the air and generates impurities (such as $Li_2CO_3$ and/or the like), and thus may consume LiOH that primarily deteriorates the discharge capacity through the firing under the high temperature condition. Accordingly, stability of the lithium nickel composite oxide may be improved.

The lithium nickel composite oxide of one embodiment having high stability may be suppressed from the formation of the rock salt-like structure (that does not contributing to the intercalation and deintercalation of Li) during the repeated charge and discharge cycles. Accordingly, the lithium nickel composite oxide of one embodiment as a positive active material may improve the characteristics of a rechargeable lithium battery.

In other words, the lithium nickel composite oxide according to one embodiment may be manufactured by firing its precursor(s) under a high oxygen partial pressure ranging from about 0.1 MPa to less than about 0.5 MPa. Accordingly, the average valence of the transition metals included in the lithium nickel composite oxide may be increased to greater than or equal to about 2.9. In addition, the lithium nickel composite oxide is suppressed from excessive crystal growth under the firing condition and thus may have a lower diffraction peak intensity ratio $I_{(003)}/I_{(104)}$ (as a crystalline height index) within a range of greater than or equal to about 0.92 to less than or equal to about 1.02. Furthermore, as the crystal growth is suppressed under the firing condition, a full width at half maximum, that is, $FWHM_{(003)}$ of the diffraction peak of the (003) phase becomes widened to greater than or equal to about 0.13 to less than or equal to about 0.15, while $FWHM_{(104)}$ of the diffraction peak of the (104) phase becomes widened to greater than or equal to about 0.15 to less than or equal to about 0.18. Hereinafter, one of more of these ranges are referred to as "the range(s) of one embodiment."

The lithium nickel composite oxide includes a nickel-containing metal and lithium, and nickel is present in an amount of greater than or equal to about 80 atm % based on the total atom amount of the nickel-containing metal (e.g., the nickel-containing metal may include 100 atm % nickel, or may include nickel and at least one metal excluding lithium and nickel). In other words, the lithium nickel composite oxide may be a high nickel-based composite oxide.

The lithium nickel composite oxide may be represented by Chemical Formula 1.

$$Li_aNi_xCo_yM_zO_2 \qquad \text{Chemical Formula 1}$$

In Chemical Formula 1, M is at least one metal selected from aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce), $0.2 \leq a \leq 1.2$, $0.8 \leq x < 1$, $0 < y \leq 0.2$, $0 \leq z \leq 0.1$, and $x+y+z=1$.

For example, in Chemical Formula 1, x may be in a range of $0.85 \leq x < 1$.

According to one embodiment, a lithium nickel composite oxide having a high Ni ratio as shown in Chemical Formula 1 may be more effectively suppressed from the generation of a rock salt-like structure not contributing to the intercalation and deintercalation of Li.

A lithium nickel composite oxide according to one embodiment includes secondary particles where fine primary particles are agglomerated, and an average particle diameter (D50) of the secondary particles may be greater than or equal to about 8 μm and less than or equal to about 25 μm, for example, greater than or equal to about 8 μm and less than or equal to about 20 μm. When the secondary particles of the lithium nickel composite oxide have an average particle diameter within these ranges, characteristics of a rechargeable lithium battery may be more effectively improved.

Herein, D50 indicates a particle diameter where an accumulated value is 50% in a particle diameter distribution curve and is called a median diameter. The particle diameter distribution for calculating the average particle diameter (D50) of the secondary particles may be obtained utilizing a known method, for example, a laser diffraction scattering method. In addition, the average particle diameter of the secondary particles indicates a diameter when the secondary particle is considered to be spherical.

Hereinafter, a method of manufacturing the lithium nickel composite oxide is described. The method of manufacturing the lithium nickel-based oxide particle is not particularly limited, but may be, for example, a co-precipitation method.

Hereinafter, the method of manufacturing the lithium nickel-based oxide particle utilizing the co-precipitation method is illustrated, but is only one example, and the mixing amounts, raw materials, and/or the like are not limited thereto.

First, nickel sulfate.6 hydrate ($NiSO_4 \cdot 6H_2O$), cobalt sulfate.5 hydrate ($CoSO_4 \cdot 5H_2O$), and a metal (M)-containing compound are dissolved in ion exchange water, thereby preparing a mixed aqueous solution. Herein, the nickel sulfate.6 hydrate, the cobalt sulfate.5 hydrate, and the metal (M)-containing compound may be utilized, for example, in a total weight of about 20 wt %, based on the entire (total) weight of the mixed aqueous solution. In addition, the nickel sulfate.6 hydrate, the cobalt sulfate.5 hydrate, and the metal (M)-containing compound may be mixed in a desired mole ratio among Ni, Co, and M. On the other hand, the mole ratio of each element may be determined depending on the composition of the prepared lithium nickel-based oxide, for example, $Li_{1.06}Ni_{0.9}Co_{0.08}Mn_{0.02}O_2$ may be prepared in a mole ratio of 90:8:2=Ni:Co:Mn.

In the metal (M)-containing compound, the metal element, M, may be at least one selected from aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). Examples of the metal (M)-containing compound may be various suitable salts (such as sulfates and nitrates of the metal element, M), oxides, hydroxides, and/or the like.

In addition, a set or predetermined amount, for example, about 500 ml, of ion exchange water is added to the mixed aqueous solution which refers to an aqueous solution of a reaction layer, and the mixture is maintained at about 50° C. Hereinafter, the aqueous solution of the reaction layer is called a reaction layer aqueous solution. Subsequently, the ion exchange water is bubbled by an inert gas such as nitrogen and/or the like to remove oxygen dissolved therein. Then, the aforementioned mixed aqueous solution is added thereto, while the reaction layer aqueous solution is agitated and maintained at 50° C. The addition speed is not particularly limited, but if excessively fast, a uniform precursor (co-precipitated carbonate salt) may not be obtained. For example, the addition speed may be about 3 ml/min.

Then, a saturated $NaCO_3$ aqueous solution is added in an excess amount regarding (relative to the amount of) the Ni, Co, and M of the mixed aqueous solution to the reaction layer aqueous solution. The reaction layer aqueous solution is maintained at a pH of 11.5 and a temperature of 50° C. during the addition. The addition may be performed, for example, at a set or predetermined agitation speed for a set or predetermined time. Accordingly, a carbonate salt of each metal element is co-precipitated.

Continuously, the co-precipitated carbonate salt is taken from the reaction layer aqueous solution through solid-liquid separation, for example, adsorption-filtering, and then rinsed (e.g., cleaned) with ion exchange water. Subsequently, the co-precipitated carbonate salt is vacuum-dried, for example, at about 100° C. for about 10 hours (h).

Subsequently, the dried co-precipitated carbonate salt is ground with a mortar and pestle for several minutes to obtain a dry powder, and the dry powder is mixed with lithium hydroxide (LiOH) to obtain a mixed powder. Herein, a mole ratio of Li with Ni, Co, and M (Ni+Co+M=Me) is determined by the composition of the lithium nickel composite oxide. For example, $Li_{1.06}Ni_{0.9}Co_{0.08}Mn_{0.02}O_2$ may be prepared in a Li/Me mole ratio of about 1.06 between Li and Me.

The mixed powder is fired at a set or predetermined temperature under a high oxygen partial pressure for a set or predetermined time. Accordingly, lithium nickel composite oxide according to one embodiment is obtained.

During the firing, the oxygen partial pressure may be in a range of greater than about 0.1 MPa and less than about 0.5 MPa, for example, greater than about 0.1 MPa and less than about 0.4 MPa. In addition, the firing time may be, for example, about 10 hours, and the firing temperature may be, for example, in a range of about 750° C. to about 850° C.

The lithium nickel composite oxide prepared in the above method according to one embodiment may have a diffraction peak intensity ratio $I_{(003)}/I_{(104)}$ of the (003) phase and the (104) phase, a full width at half maximum $FWHM_{(003)}$ of diffraction peak of the (003) phase, a full width at half maximum $FWHM_{(104)}$ of diffraction peak of the (104) phase, and the average valence of transition metals within the above described ranges.

On the other hand, each parameter of the lithium nickel composite oxide may be adjusted by adjusting an agitation speed and agitation time during the addition, a Li/Me mole ratio between Li and Me, an oxygen partial pressure, firing time and firing temperature during the firing, and/or the like.

For example, as the firing temperature is higher, a diffraction peak intensity ratio $I_{(003)}/I_{(104)}$ of the (003) phase and the (104) phase tends to be higher, while the full width at half maximum $FWHM_{(003)}$ and $FWHM_{(104)}$ of the diffraction peaks of the (003) phase and the (104) phase tend to be smaller.

In addition, as the mole ratio Li/Me is higher, the diffraction peak intensity ratio $I_{(003)}/I_{(104)}$ of the (003) phase and the (104) phase tends to be higher, while the full width at half maximum $FWHM_{(003)}$ and $FWHM_{(104)}$ of the diffraction peaks of the (003) phase and the (104) phase tend to be smaller.

In addition, as the oxygen partial pressure during the firing is higher, the average valence of transition metals included in the lithium nickel composite oxide tends to be higher, while the full width at half maximum $FWHM_{(104)}$ of the diffraction peak of the (104) phase tends to be larger.

Through the above processes, the lithium nickel composite oxide may be prepared.

A positive active material layer according to one embodiment may include other positive active materials in addition to the lithium nickel composite oxide.

The conductive material is not particularly limited as long as it increases conductivity of a positive electrode, and may be, for example, carbon black (such as ketjen black, acetylene black, and/or the like), natural graphite, artificial graphite, carbon nanotubes, graphene, fiber-shaped carbon (such as carbon nanofibers and/or the like), and/or a composite of the fiber-shaped carbon and carbon black.

The binder may be, for example, polyvinylidene fluoride, an ethylene-propylene-diene terpolymer, a styrene-butadiene rubber, an acrylonitrile-butadiene rubber, a fluorine rubber, polyvinylacetate, polymethylmethacrylate, polyethylene, nitrocellulose, and/or the like, and is not particularly limited as long as it binds the positive active material and the conductive material on a current collector, and simultaneously (or concurrently) has oxidation resistance for high potential of a positive electrode and electrolyte stability.

The positive electrode 20 may be manufactured in the following method. First, the positive active material, the conductive material, and the binder are mixed in a desirable ratio and dispersed in an organic solvent (such as N-methyl-2-pyrrolidone) to form a slurry. Subsequently, the slurry is coated on a current collector 21 and then dried to form a positive active material layer 22. Herein, the coating method is not particularly limited, and may be, for example, a knife coating method, a gravure coating method, and/or the like. Then, the positive active material layer 22 is compressed utilizing a compressor to a desirable thickness to manufacture a positive electrode 20. A thickness of the positive active material layer 22 is not particularly limited, and may be any suitable thickness that is applicable to a positive active material layer of a rechargeable lithium battery.

The negative electrode 30 includes a current collector 31 and a negative active material layer 32 formed on the current collector 31.

The current collector 31 may be any suitable conductor, for example, copper, a copper alloy, aluminum, stainless steel, nickel-plated steel, and/or the like.

The negative active material layer 32 may be any suitable negative active material layer of a rechargeable lithium battery. For example, the negative active material layer 32 may include a negative active material, and may further include a binder.

The negative active material may include a carbon-based material, a silicon-based material, a tin-based material, a lithium metal oxide, a metal lithium, and/or the like, which may be utilized singularly or as a mixture of two or more. The carbon-based material may be, for example, a graphite-based material such as artificial graphite, natural graphite, a mixture of artificial graphite and natural graphite, natural graphite coated with artificial graphite, and/or the like. The silicon-based material may be, for example, silicon, a silicon oxide, a silicon-containing alloy, a mixture of the graphite-based material with the foregoing materials, and/or the like. The silicon oxide may be represented by $SiO_x$ ($0<x\leq2$). The silicon-containing alloy may be an alloy including silicon in the largest amount of the total metal elements (e.g., silicon being the metal element that is present in the largest amount of all the metal elements) based on the total amount of the alloy, for example, a Si—Al—Fe alloy. The tin-based material may be, for example, tin, a tin oxide, a tin-containing alloy, a mixture of the graphite-based material with the foregoing materials, and/or the like. The lithium metal oxide may be, for example, a titanium oxide compound such as $Li_4Ti_5O_{12}$. According to one embodiment, among them, graphite may further improve cycle-life characteristics of a rechargeable lithium battery.

The binder is not particularly limited, and may be the same binder as the binder of the positive electrode.

A weight ratio of the negative active material and the binder is not particularly limited, and may be a weight ratio of a related art rechargeable lithium battery.

The negative electrode 30 may be manufactured as follows. The negative active material and the binder are mixed in a desired ratio and the mixture is dispersed in an appropriate solvent (such as water and/or the like) to prepare a slurry. Then, the slurry is applied on a current collector 31 and dried to form a negative active material layer 32. Then, the negative active material layer 32 is compressed to have a desired thickness by utilizing a compressor, thereby manufacturing the negative electrode 30. Herein, the negative active material layer 32 has no particularly limited thickness, but may have any suitable thickness that a negative active material layer for a rechargeable lithium ion battery may have. In addition, when metal lithium is utilized as the negative active material layer 32, the metal lithium may be overlapped with (e.g., laminated or coated on) the current collector 31.

The separator layer 40 may include a separator and an electrolyte.

The separator is not particularly limited, and may be any suitable separator utilized for a rechargeable lithium ion battery. For example, a porous layer or a non-woven fabric showing excellent high rate discharge performance and/or the like may be utilized alone or as a mixture (e.g., in a laminated structure).

A substrate of the separator may include, for example, a polyolefin-based resin, a polyester-based resin, polyvinylidene difluoride (PVDF), a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoropropylene copolymer, a vinylidene difluoride-tetrafluoroethylene-hexafluoropropylene copolymer, a vinylidene difluoride-ethylene-tetrafluoroethylene copolymer, and/or the like. The polyolefin-based resin may be polyethylene, polypropylene, and/or the like; and the polyester-based resin may be polyethylene terephthalate, polybutylene terephthalate, and/or the like.

A porosity of the separator is not particularly limited, and may be any suitable porosity that a separator of a rechargeable lithium battery may have.

The separator may be formed on at least one side of the substrate, and may include a coating layer including an inorganic filler. The inorganic filler may include $Al_2O_3$, $Mg(OH)_2$, $SiO_2$, and/or the like. The coating layer including the inorganic filler may inhibit direct contact between the positive electrode and the separator, inhibit oxidation and decomposition of an electrolyte on the surface of the positive electrode during storage at a high temperature, and suppress the generation of gas which is a decomposed product of the electrolyte.

The electrolyte may include an electrolyte salt in a non-aqueous solvent.

The non-aqueous solvent may be, for example, cyclic carbonates (such as propylene carbonate, ethylene carbonate, butylene carbonate, chloroethylene carbonate, vinylene carbonate, and/or the like); linear carbonates (such as dimethyl carbonate, diethyl carbonate, ethylmethyl carbonate, and/or the like); cyclic esters (such as γ-butyrolactone, γ-valerolactone, and/or the like); linear esters (such as methyl formate, methyl acetate, butyric acid methyl, and/or the like); tetrahydrofuran or a derivative thereof; ethers (such as 1,3-dioxane, 1,4-dioxane, 1,2-dimethoxy ethane, 1,4-dibutoxyethane, methyl diglyme, and/or the like); nitriles (such as acetonitrile, benzonitrile, and/or the like); dioxolane or a derivative thereof; ethylene sulfide; sulfolane; and/or sultone or a derivative thereof, which may be utilized singularly or as a mixture of two or more, without being limited thereto.

The electrolytic salt may be, for example, an inorganic ion salt including lithium (Li), sodium (Na), and/or potassium (K), such as $LiClO_4$, $LiBF_4$, $LiAsF_6$, $LiPF_6$, $LiPF_{6-x}(CnF_{2n+1})_x$ (1<x<6, n=1 or 2), LiSCN, LiBr, LiI, $Li_2SO_4$, $Li_2B_{10}Cl_{10}$, $NaClO_4$, NaI, NaSCN, NaBr, $KClO_4$, KSCN, and/or the like; and/or an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearyl sulfonate, lithium octyl sulfonate, lithium dodecylbenzene sulfonate, and/or the like. The ionic compounds may be utilized singularly or in a mixture of two or more.

A concentration of the electrolyte salt is not particularly limited, and may be, for example, about 0.5 mol/L to about 2.0 mol/L.

The electrolyte may further include various suitable additives such as a negative electrode SEI (Solid Electrolyte Interface) forming agent, a surfactant, and/or the like.

Such additives may be, for example, succinic anhydride, lithium bis(oxalato)borate, lithium tetrafluoroborate, a dinitrile compound, propane sultone, butane sultone, propene sultone, 3-sulfolene, a fluorinated allylether, a fluorinated acrylate, and/or the like.

The concentration of the additives may be any suitable one that is utilized in a general rechargeable lithium ion battery.

Hereinafter, a method of manufacturing a rechargeable lithium ion battery 10 is described.

The separator is disposed between the positive electrode 20 and the negative electrode 30 to manufacture an electrode structure, and the electrode structure is processed to have a desired shape, for example, a cylinder, a prism, a laminate shape, a button shape, and/or the like, and inserted into a container having the same shape. Then, the non-aqueous electrolyte is injected into the container, and the electrolyte is impregnated in the pores in the separator, thereby manufacturing a rechargeable lithium battery.

Hereinafter, the embodiments are illustrated in more detail with reference to the following examples. However, these examples are exemplary, and the present disclosure is not limited thereto. Furthermore, what is not described in this disclosure may be sufficiently understood by those who have knowledge in this field and will not be illustrated herein.

Preparation of Lithium Nickel Composite Oxide

Examples 1 to 9, Comparative Examples 1 to 3, and Reference Examples 1 to 3

Nickel sulfate.6 hydrate ($NiSO_4.6H_2O$), cobalt sulfate.5 hydrate ($CoSO_4.5H_2O$), and manganese sulfate.7 hydrate ($MnSO_4.7H_2O$) (or aluminum nitrate ($Al(NO_3)_3$)) were dissolved in ion exchange water, thus preparing a mixed aqueous solution. Herein, the nickel sulfate.6 hydrate, the cobalt sulfate.5 hydrate, and the manganese sulfate.7 hydrate (or aluminum nitrate) were utilized in a total weight of 20 wt % based on the entire weight of the mixed aqueous solution. In addition, the nickel sulfate.6 hydrate, the cobalt sulfate.5 hydrate, and the manganese sulfate.7 hydrate (or aluminum nitrate) were mixed in a mole ratio of 90:8:2 or 85:12:3 among Ni, Co, and Mn (or Al).

In addition, 500 ml of ion exchange water was injected into the reaction layer, and the mixture was maintained at 50° C. Subsequently, the ion exchange water was bubbled by nitrogen gas, thereby removing oxygen dissolved therein. Subsequently, the reaction layer aqueous solution was agitated and maintained at 50° C., and the above mixed aqueous solution was added thereto in a dropwise fashion at a speed of 3 ml/min. Then, a $NaCO_3$ aqueous solution excessively saturated regarding Ni and Co in the mixed aqueous solution was added (e.g., more $NaCO_3$ than what is needed to saturate Ni and Co was added) to a reaction bath aqueous solution in a dropwise fashion. The reaction layer aqueous solution was maintained at a pH of 11.5 and a temperature of 50° C. during the addition. Herein, the agitation was performed at a circumferential speed of 4 to 5 m/s for 10 hours. Accordingly, a carbonate salt of each metal element was co-precipitated.

Subsequently, the co-precipitated carbonate salt was taken from the reaction layer aqueous solution through solid-liquid separation, for example, adsorption filtering, and then cleaned (e.g., rinsed) with ion exchange water. Subsequently, the co-precipitated carbonate salt was vacuum-dried, for example, at about 100° C. for about 10 hours (h).

Then, the dried co-precipitated carbonate salt was ground with a mortar and pestle for several minutes to obtain a dry powder, and the dry powder was mixed with lithium hydroxide (LiOH) to obtain a mixed powder. Herein, Li and Me (Ni+Co+Mn (or Al)) were mixed in a Li/Me mole ratio of 1.06 or 1.0.

Subsequently, the mixed powder was fired at a temperature of 770° C. or 790° C. under an oxygen partial pressure of 0.1 MPa, 0.2 Mpa, or 0.5 Mpa for 10 hours, thereby manufacturing a lithium nickel composite oxide.

The composition of each lithium nickel composite oxide according to Examples 1 to 9, Comparative Examples 1 to 3, and Reference Examples 1 to 3 and its firing condition are provided in Table 1.

TABLE 1

| | Composition Chemical Formula | Firing temperature | Oxygen partial pressure |
|---|---|---|---|
| Example 1 | $Li_{1.06}Ni_{0.9}Co_{0.08}Mn_{0.02}O_2$ | 770° C. | 0.2 MPa |
| Example 2 | $Li_{1.03}Ni_{0.9}Co_{0.08}Mn_{0.02}O_2$ | 770° C. | 0.2 MPa |
| Example 3 | $Li_{1.03}Ni_{0.9}Co_{0.08}Mn_{0.02}O_2$ | 790° C. | 0.2 MPa |
| Example 4 | $LiNi_{0.9}Co_{0.08}Al_{0.02}O_2$ | 770° C. | 0.2 MPa |
| Example 5 | $LiNi_{0.9}Co_{0.08}Al_{0.02}O_2$ | 790° C. | 0.2 MPa |
| Example 6 | $LiNi_{0.85}Co_{0.12}Mn_{0.03}O_2$ | 770° C. | 0.2 MPa |
| Example 7 | $LiNi_{0.85}Co_{0.12}Mn_{0.03}O_2$ | 790° C. | 0.2 MPa |
| Example 8 | $LiNi_{0.85}Co_{0.12}Al_{0.03}O_2$ | 770° C. | 0.2 MPa |
| Example 9 | $LiNi_{0.85}Co_{0.12}Al_{0.03}O_2$ | 790° C. | 0.2 MPa |
| Comparative Example 1 | $Li_{1.06}Ni_{0.9}Co_{0.08}Mn_{0.02}O_2$ | 770° C. | 0.1 MPa |
| Reference Example 1 | $Li_{1.03}Ni_{0.9}Co_{0.08}Mn_{0.02}O_2$ | 770° C. | 0.1 MPa |
| Reference Example 2 | $LiNi_{0.9}Co_{0.08}Mn_{0.02}O_2$ | 770° C. | 0.5 MPa |
| Reference Example 3 | $LiNi_{0.85}Co_{0.12}Mn_{0.03}O_2$ | 770° C. | 0.5 MPa |
| Comparative Example 2 | $LiNi_{0.85}Co_{0.12}Al_{0.03}O_2$ | 770° C. | 0.5 MPa |
| Comparative Example 3 | $LiNi_{0.85}Co_{0.12}Al_{0.03}O_2$ | 790° C. | 0.5 MPa |

Evaluation 1: X-ray Diffraction

X-ray diffraction of each lithium nickel composite oxide according to Examples 1 to 9, Comparative Examples 1 to 3, and Reference Examples 1 to 3 was measured.

Figure 2B:
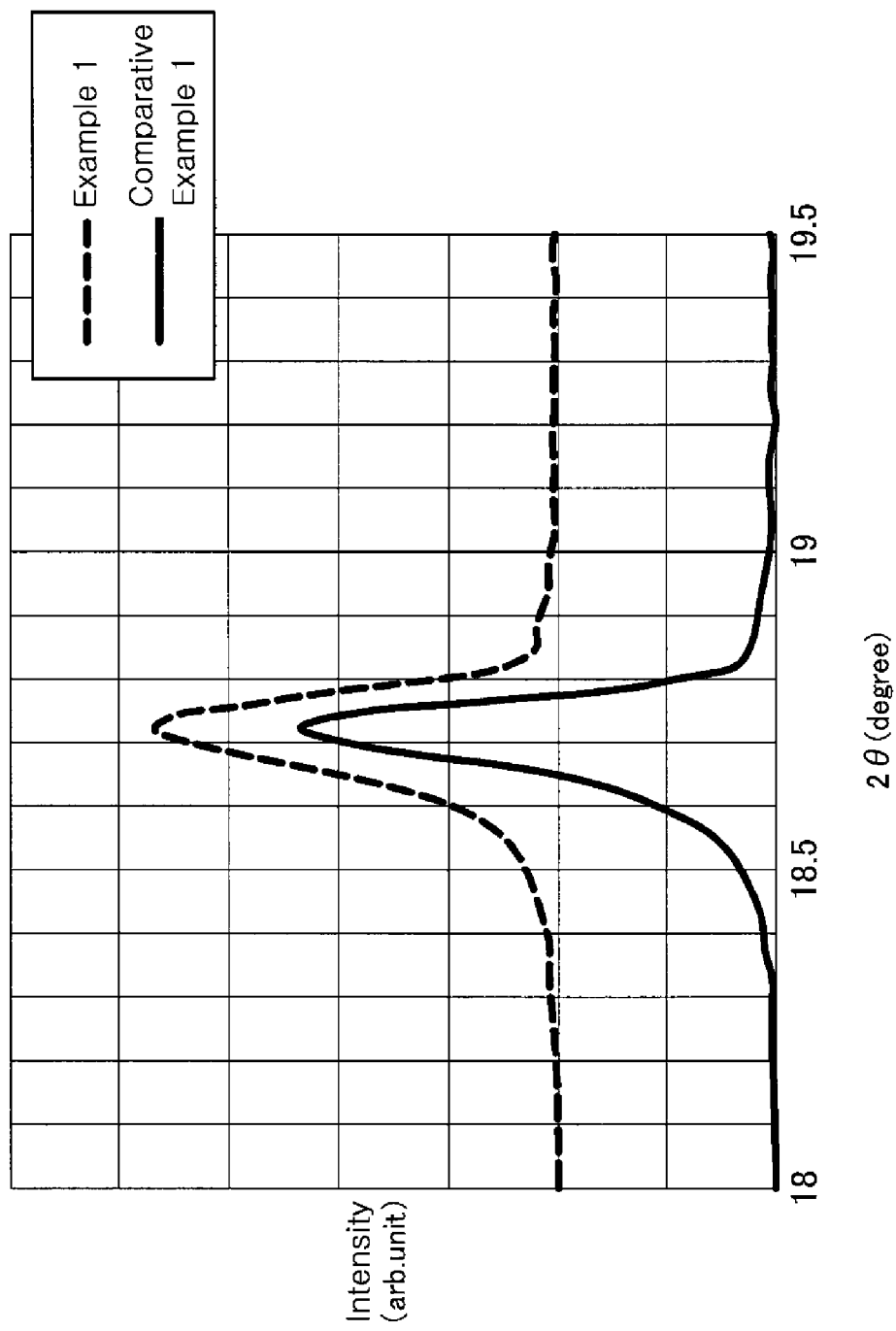
FIG. 2B is a graph enlarging a region around the diffraction angle (2θ) of 19° in FIG. 2A.
Figure 3A:
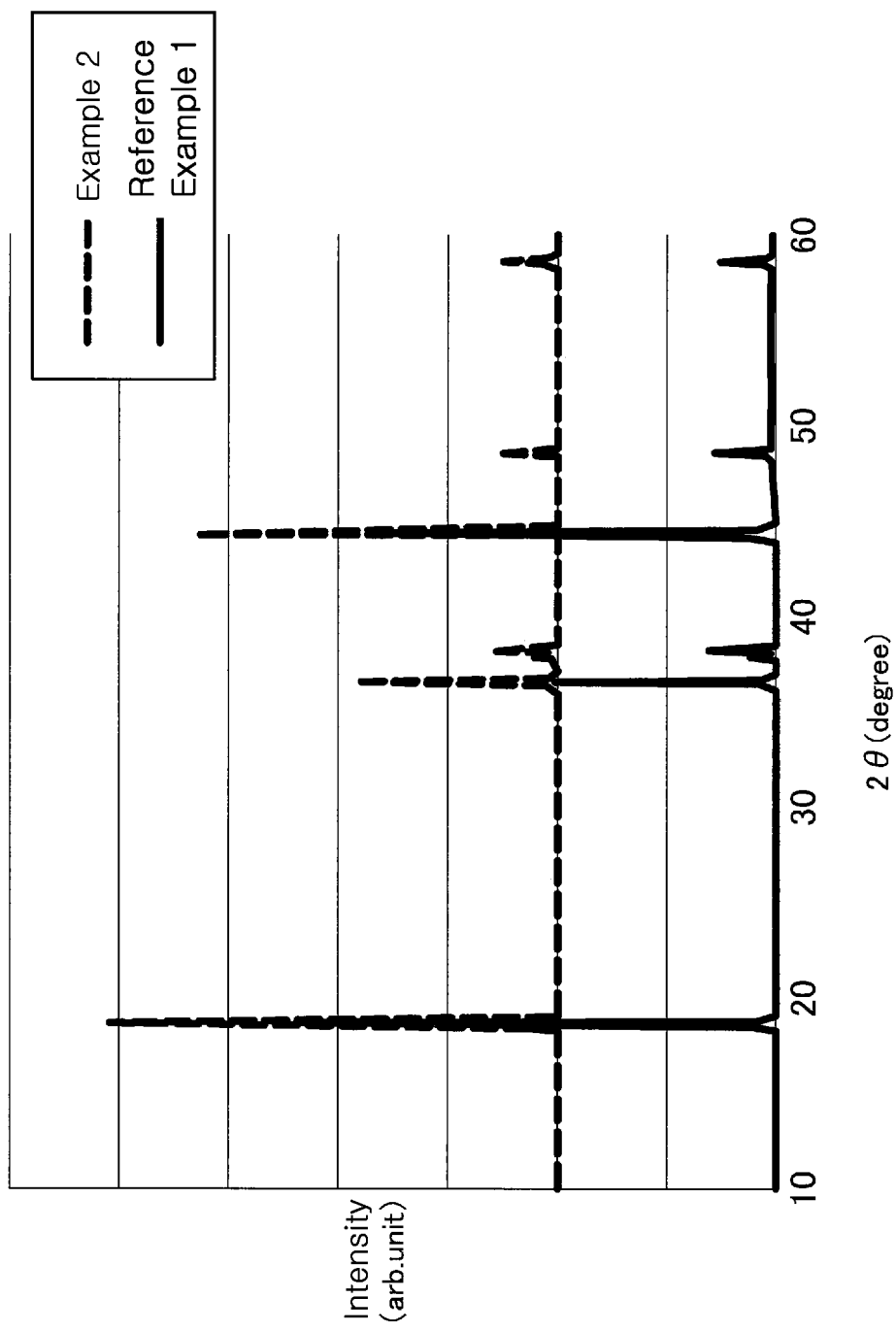
FIG. 3A is a graph showing X-ray diffraction analysis of positive active materials according to Example 2 and Reference Example 1.
Figure 3B:
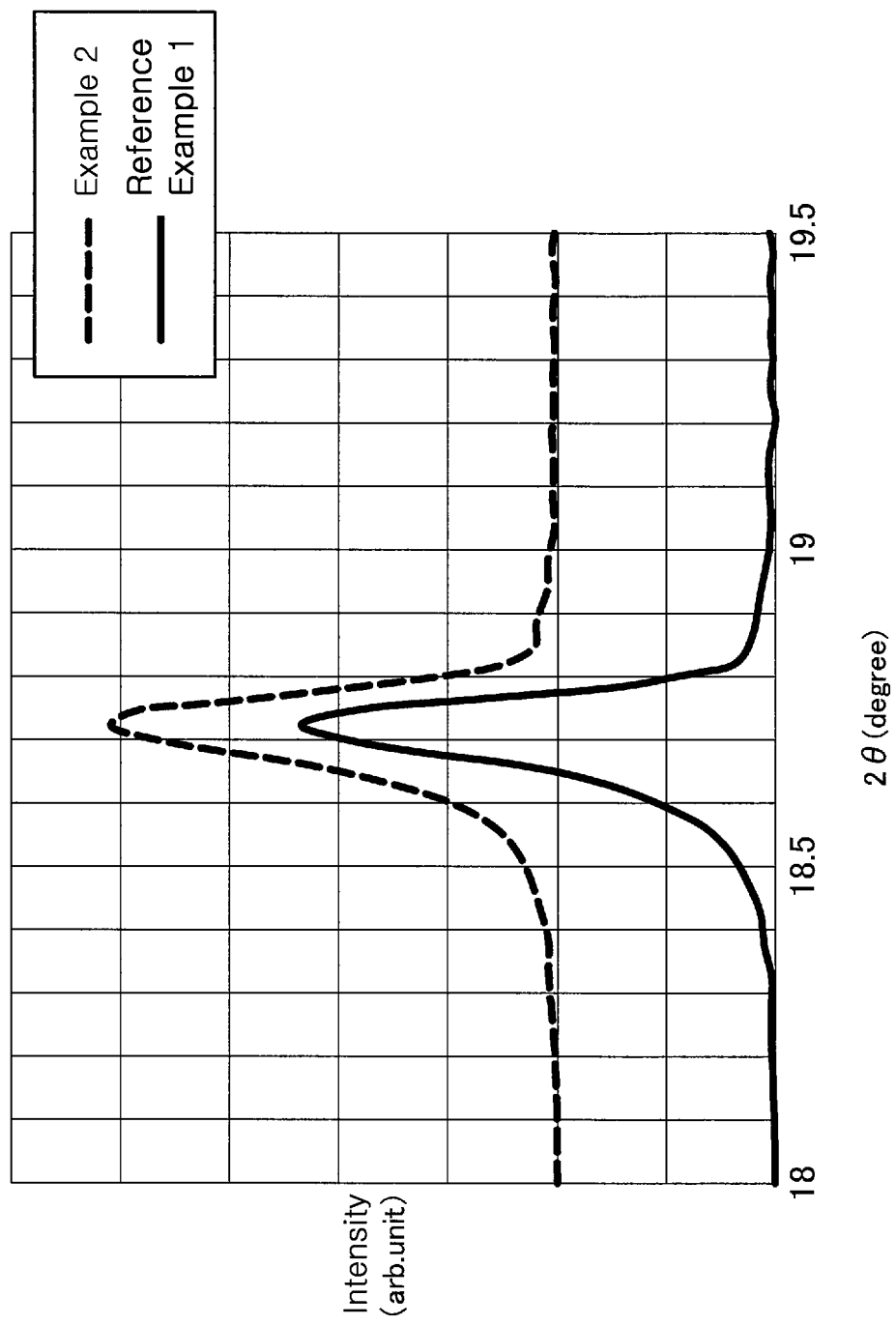
FIG. 3B is a graph enlarging a region around the diffraction angle (2θ) of 19° in FIG. 3A.

For example, FIGS. 2A and 2B show X-ray diffraction results of Example 1 and Comparative Example 1, and FIGS. 3A and 3B show X-ray diffraction results of Example 2 and Reference Example 1.

FIG. 2A is a graph showing X-ray diffraction analysis results of the positive active materials according to Example 1 and Comparative Example 1, and FIG. 2B is a graph enlarging a region around a diffraction angle (2θ) of 19° in FIG. 2A. In addition, FIG. 3A is a graph showing X-ray diffraction analysis results of the positive active materials according to Example 2 and Reference Example 1, and FIG. 3B is a graph enlarging a region around a diffraction angle (2θ) of 19° in FIG. 3A.

Herein, "arb.unit", a unit in the vertical axis in FIGS. 2A, 2B, 3A, and 3B, indicates an arbitrary unit.

Referring to FIGS. 2A and 3A, the lithium nickel composite oxides according to Examples 1 and 2, Comparative Example 1, and Reference Example 1 showed a diffraction peak of a (003) phase at the diffraction angle (2θ) of 19° and a diffraction peak (104) of a (104) phase at a diffraction angle (2θ) of 44° in the X-ray diffraction analysis.

In addition, as shown in FIGS. 2B and 3B, Examples 1 and 2 (each had a different oxygen partial pressure condition from that of Comparative Example 1 and Reference Example 1 respectively) each have a larger (e.g., greater) full width at half maximum $FWHM_{(003)}$ of the diffraction peak of the (003) phase than those of Comparative Example 1 and Reference Example 1 respectively, and thus the diffraction peak of the (003) phase was extended.

In addition, the diffraction peak intensity ratio $I_{(003)}/I_{(104)}$ of the (003) phase and (104) phase, the full width at half maximum $(FWHM)_{(003)}$ of the diffraction peak of the (003) phase, the full width at half maximum $(FWHM)_{(104)}$ of the diffraction peak of the (104) phase, and the average valence of transition metals in the lithium nickel composite oxides according to Examples 1 to 9, Comparative Examples 1 to 3, and Reference Examples 1 to 3 were calculated based on a diffraction peak of the X-ray diffractions of each of the examples and comparative examples. The obtained results are provided in Table 3.

Herein, the average valence of transition metals was obtained by measuring the oxygen amount of the lithium nickel composite oxide with a carbon, hydrogen, nitrogen, sulfur/oxygen (CHNS/O) automated elemental analyzer (2400II, PerkinElmer Inc.) and utilizing it as described above.

Evaluation 2: Cycle Characteristics

Each lithium nickel composite oxide according to Examples 1 to 9, Comparative Examples 1 to 3, and Reference Examples 1 to 3, acetylene black, and polyvinylidene fluoride were mixed in a weight ratio of 95:2:3, and then dispersed in N-methyl-2-pyrrolidone, thereby preparing a slurry. The slurry was coated on an aluminum foil and dried to form a positive active material layer, thus manufacturing a positive electrode.

A negative electrode was manufactured by coating a metal lithium foil on a copper foil.

A separator was manufactured as (manufactured utilizing) a 12 μm-thick porous polyethylene film coated with a mixture of $Mg(OH)_2$ particulates and polyvinylidene fluoride (PVdF) in a weight ratio of 70:30.

The separator was disposed between the positive and negative electrodes, thereby forming an electrode structure.

Subsequently, the electrode structure was processed to have a 2032 coin half-cell size and inserted into a coin half-cell container. Then, an electrolyte solution was prepared by mixing ethylene carbonate and dimethyl carbonate in a volume ratio of 3:7 to prepare a non-aqueous solvent, and dissolving hexafluorolithium phosphate ($LiPF_6$) in a concentration of 1.3 mol/L therein. Subsequently, the electrolyte solution was injected into the coin half-cell container and impregnated into the separator, thereby manufacturing a half-cell.

Charge and discharge cycle characteristics of rechargeable lithium battery cells according to Examples 1 to 9, Comparative Examples 1 to 3, and Reference Examples 1 to 3 were evaluated, and the results are provided in Table 3 and FIGS. 4A to 7.

For example, the cells were charged and discharged at a charge rate, a discharge rate, and a cut-off voltage as provided in Table 2.

On the other hand, CC-CV in Table 2 indicates a constant current/constant voltage charge, and CC indicates a constant current discharge. The cut-off voltage indicates a voltage when the charge and the discharge ended. For example, 4.3-3.0 under the cut-off voltage indicates that the 1$^{st}$ cycle charge was performed up to 4.3 V to which a voltage of a rechargeable lithium battery cell was reached, and the 1$^{st}$ discharge was performed down to 3.0 V to which a voltage of the rechargeable lithium battery cell was reached.

TABLE 2

| Test cycle | Charge rate | Discharge rate | Cut-off voltage [V] |
|---|---|---|---|
| 1 | 0.2 C CC-CV | 0.2 C CC | 4.3-3.0 |
| 2 | 1.0 C CC-CV | 1.0 C CC | 4.3-3.0 |
| 3-49 | 1.0 C CC-CV | 1.0 C CC | 4.3-3.0 |
| 50 | 1.0 C CC-CV | 1.0 C CC | 4.3-3.0 |
| 51 | 0.2 C CC-CV | 0.2 C CC | 4.3-3.0 |

In Table 3, the "discharge capacity" indicates the discharge capacity at the 2$^{nd}$ cycle; and the "cycle characteristics" were evaluated by the capacity retention obtained by dividing the discharge capacity at the 50th cycle by the discharge capacity at the 2nd cycle, that is, a ratio of the discharge capacity at the 50th cycle relative to the discharge capacity at the 2nd cycle.

and a full width at half maximum $FWHM_{(104)}$ beyond (e.g., outside) the range of one embodiment and thus showed deteriorated discharge capacity. Furthermore, the cell of Comparative Example 3 had a full width at half maximum $FWHM_{(104)}$ and a diffraction peak intensity ratio $I_{(003)}/I_{(104)}$ beyond (e.g., outside) the ranges of one embodiment and thus showed deteriorated discharge capacity.

In addition, the result of Table 3 was scatter-plotted in FIGS. 4A to 5B.

Figure 4A:
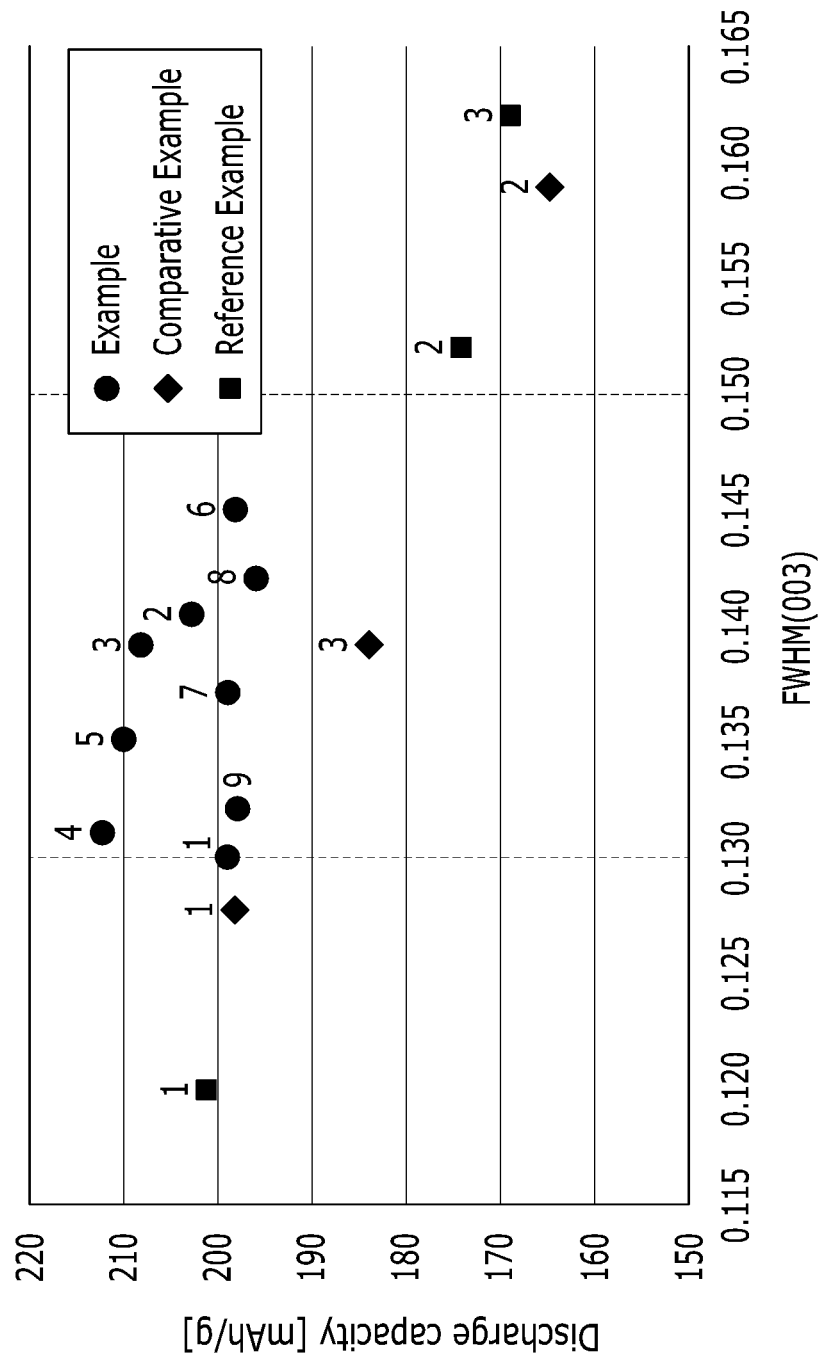
FIG. 4A is a graph showing the discharge capacity versus the full width at half maximum $FWHM_{(003)}$ of each positive active material according to Examples 1 to 9, Comparative Examples 1 to 3, and Reference Examples 1 to 3.
Figure 4B:
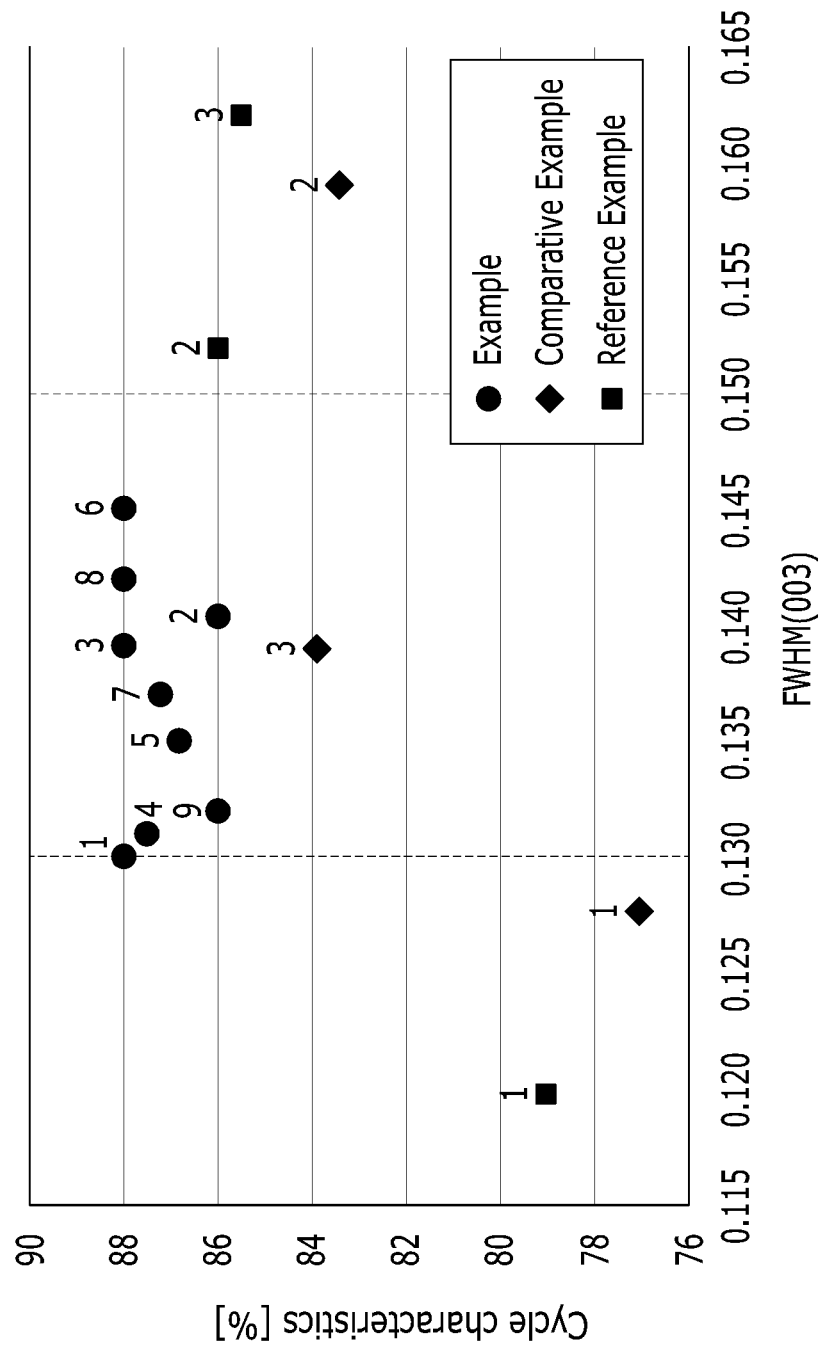
FIG. 4B is a graph showing the cycle characteristics versus the full width at half maximum $FWHM_{(003)}$ of each positive active material according to Examples 1 to 9, Comparative Examples 1 to 3, and Reference Examples 1 to 3.
Figure 5A:
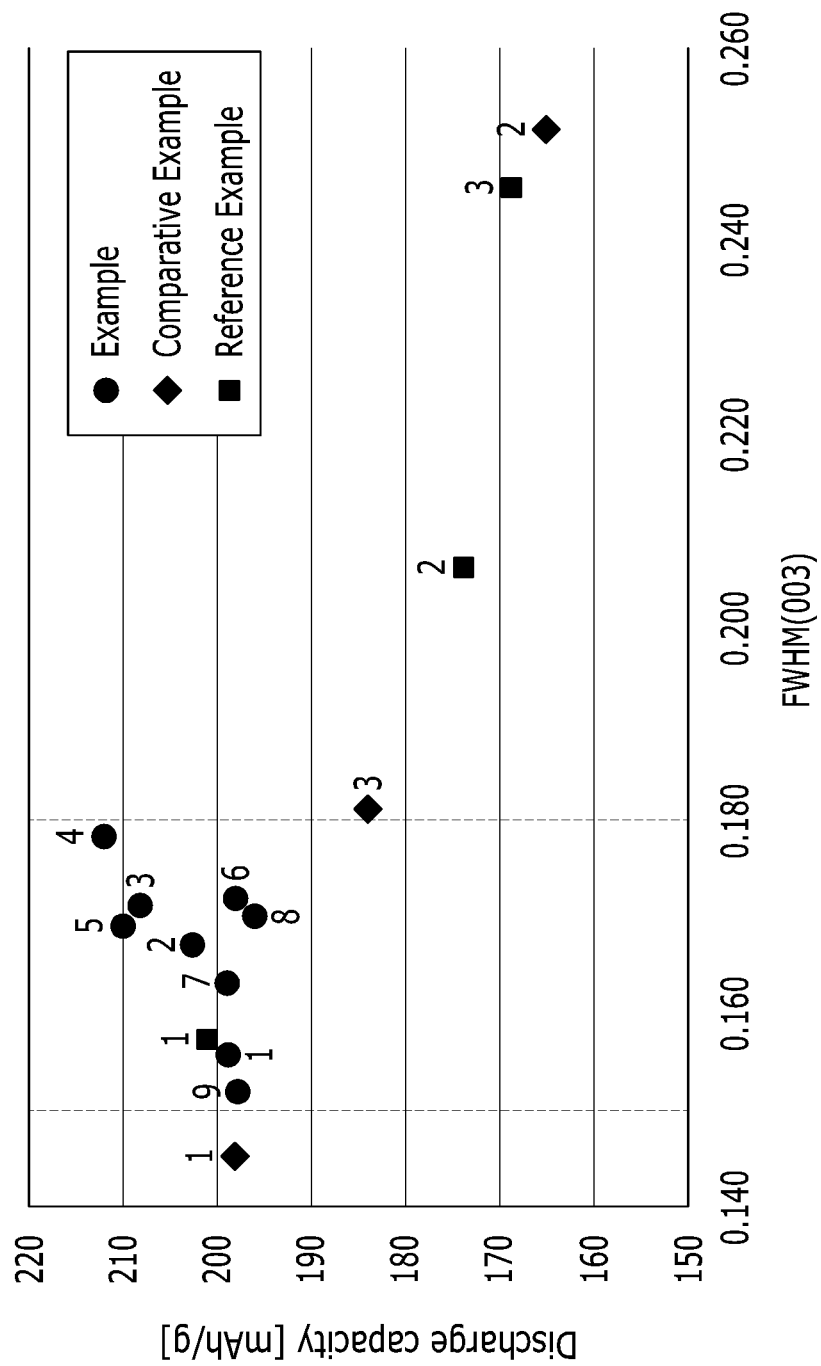
FIG. 5A is a graph showing the discharge capacity versus the full width at half maximum $FWHM_{(104)}$ of each positive active material according to Examples 1 to 9, Comparative Examples 1 to 3, and Reference Examples 1 to 3.
Figure 5B:
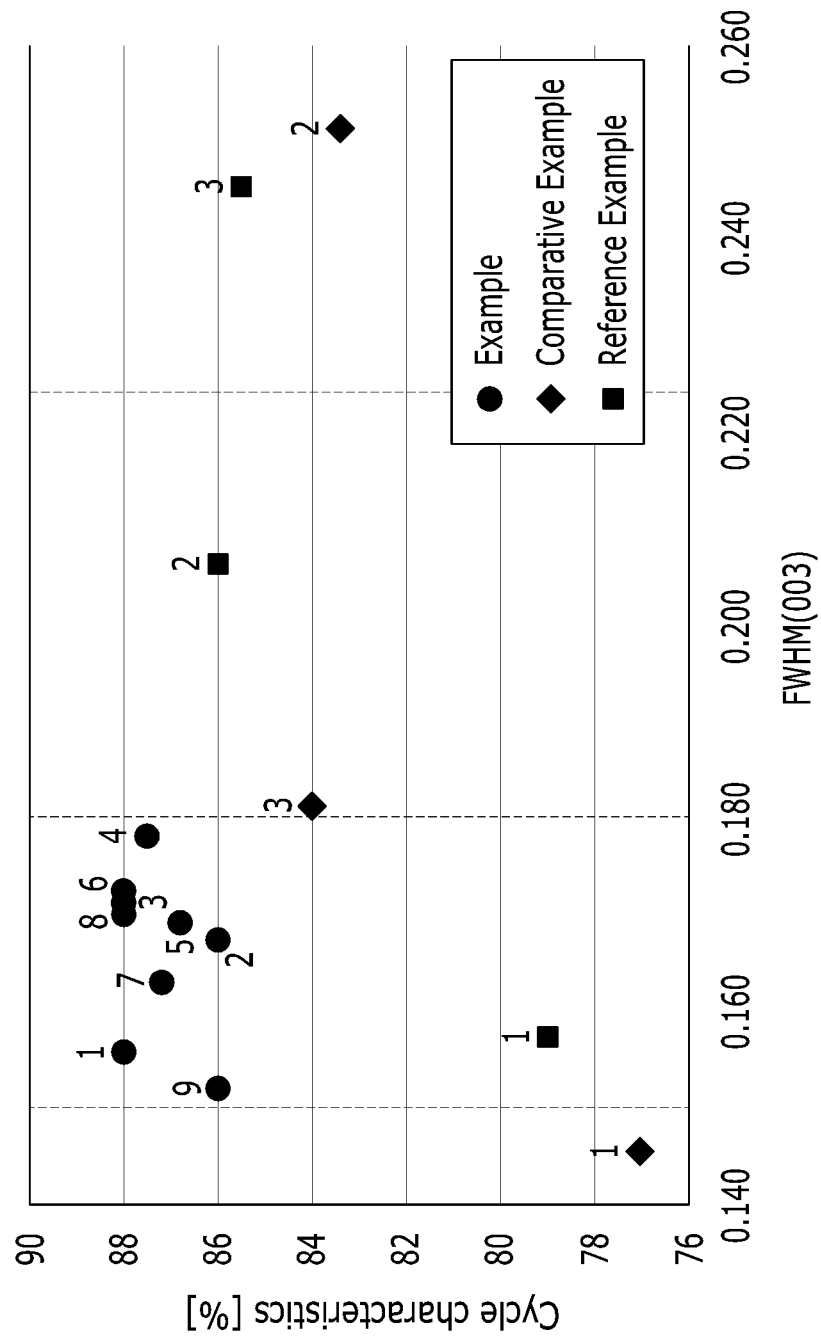
FIG. 5B is a graph showing the cycle characteristics versus the full width at half maximum $FWHM_{(104)}$ of each positive active material according to Examples 1 to 9, Comparative Examples 1 to 3, and Reference Examples 1 to 3.

FIG. 4A is a graph showing the discharge capacities regarding (versus) the full width at half maximum $FWHM_{(003)}$ of the positive active materials according to Examples 1 to 9, Comparative Examples 1 to 3, and Reference Examples 1 to 3, and FIG. 4B is a graph showing the cycle characteristics regarding (versus) the full width at half maximum $FWHM_{(003)}$ of the positive active materials according to Examples 1 to 9, Comparative Examples 1 to 3, and Reference Examples 1 to 3. In addition, FIG. 5A is a graph showing the discharge capacities regarding (versus) the full width at half maximum $FWHM_{(104)}$ of the positive active materials according to Examples 1 to 9, Comparative Examples 1 to 3, and Reference Examples 1 to 3, and FIG. 5B is a graph showing the cycle characteristics regarding (versus) the full width at half maximum $FWHM_{(104)}$ of the positive active materials according to Examples 1 to 9, Comparative Examples 1 to 3, and Reference Examples 1 to 3.

TABLE 3

| | Average particle diameter (μm) | $FWHM_{(003)}$ | $FWHM_{(104)}$ | $I_{(003)}/I_{(104)}$ | Average valence | Discharge capacity (mAh/g) | Cycle characteristics (%) |
|---|---|---|---|---|---|---|---|
| Example 1 | 10 | 0.130 | 0.156 | 1.01 | 2.90 | 199 | 88 |
| Example 2 | 10 | 0.140 | 0.167 | 0.93 | 2.94 | 203 | 86 |
| Example 3 | 10 | 0.139 | 0.171 | 0.95 | 2.92 | 208 | 88 |
| Example 4 | 10 | 0.131 | 0.178 | 0.97 | 2.92 | 212 | 88 |
| Example 5 | 10 | 0.135 | 0.169 | 0.94 | 2.92 | 210 | 87 |
| Example 6 | 10 | 0.145 | 0.172 | 0.97 | 2.92 | 198 | 88 |
| Example 7 | 10 | 0.137 | 0.163 | 0.97 | 2.91 | 199 | 87 |
| Example 8 | 10 | 0.142 | 0.170 | 0.95 | 2.93 | 196 | 88 |
| Example 9 | 10 | 0.132 | 0.152 | 1.00 | 2.90 | 198 | 86 |
| Comparative Example 1 | 10 | 0.128 | 0.145 | 1.03 | 2.86 | 198 | 77 |
| Reference Example 1 | 10 | 0.120 | 0.157 | 1.00 | 2.84 | 201 | 79 |
| Reference Example 2 | 10 | 0.152 | 0.206 | 0.94 | 2.95 | 174 | 86 |
| Reference Example 3 | 10 | 0.162 | 0.245 | 0.93 | 2.94 | 169 | 86 |
| Comparative Example 2 | 10 | 0.159 | 0.251 | 0.85 | 2.94 | 165 | 83 |
| Comparative Example 3 | 10 | 0.139 | 0.181 | 0.87 | 2.95 | 184 | 84 |

Referring to Table 3, the cells according to Examples 1 to 9 had a diffraction peak intensity ratio $I_{(003)}/I_{(104)}$, a full width at half maximum $FWHM_{(003)}$, a full width at half maximum $FWHM_{(104)}$, and an average valence within each (e.g., their respective) set or predetermined range according to one embodiment, and thus showed high discharge capacity and excellent cycle characteristics.

On the other hand, the cells according to Comparative Example 1 and Reference Example 1 had a full width at half maximum $FWHM_{(003)}$ and an average valence beyond the range of one embodiment (e.g., outside of their respective range according to one embodiment) and thus showed deteriorated cycle characteristics. In addition, the cells according to Reference Examples 2 and 3, and Comparative Example 2 had a full width at half maximum $FWHM_{(003)}$ In FIG. 4A to FIG. 5B, a "circled" dot indicates the examples, and a number assigned to them indicates the number of the examples. In addition, a "rhombic" dot indicates the comparative examples, and a number assigned to them indicates the number of the comparative examples.

Referring to FIGS. 4A and 4B, Comparative Example 1 and Reference Example 1 having a smaller full width at half maximum $FWHM_{(003)}$ than the range of one embodiment showed deteriorated cycle characteristics, while Reference Examples 2 and 3, Comparative Example 2 having a larger full width at half maximum $FWHM_{(003)}$ than the range of one embodiment showed deteriorated discharge capacity.

On the other hand, Examples 1 to 9 having a full width at half maximum $FWHM_{(003)}$ within the range of one embodiment maintained the discharge capacity and showed improved cycle characteristics.

Comparative Example 3 had a full width at half maximum $FWHM_{(003)}$ within the range of one embodiment but a full width at half maximum $FWHM_{(104)}$ out of the range of one embodiment, and thus showed deteriorated discharge capacity and cycle characteristics.

In addition, referring to FIGS. 5A and 5B, Comparative Example 1 having a smaller full width at half maximum $FWHM_{(104)}$ than the range of one embodiment showed deteriorated cycle characteristics, but Reference Examples 2 and 3, and Comparative Examples 2 and 3 having a larger full width at half maximum $FWHM_{(104)}$ than the range of one embodiment showed deteriorated discharge capacity.

On the other hand, Examples 1 to 9 had a full width at half maximum $FWHM_{(104)}$ within the range of one embodiment and thus maintained the discharge capacity and showed improved cycle characteristics.

Reference Example 1 had a full width at half maximum $FWHM_{(104)}$ within the range of one embodiment but a full width at half maximum $FWHM_{(003)}$ out of the range of one embodiment and showed deteriorated cycle characteristics.

Figure 6:
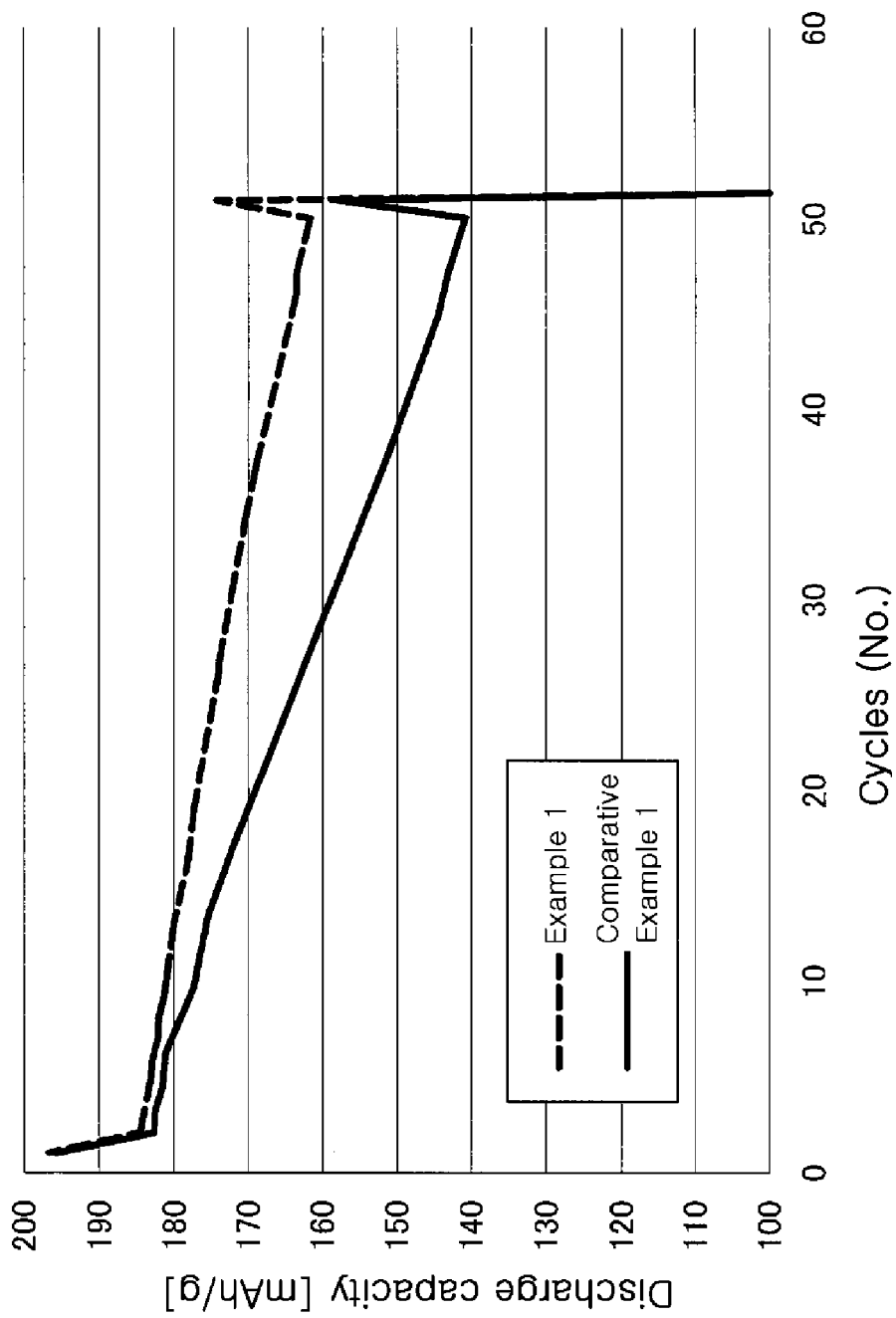
FIG. 6 is a graph showing the change in the discharge capacity depending on the charge and discharge cycles of rechargeable lithium battery cells according to Example 1 and Comparative Example 1.
Figure 7:
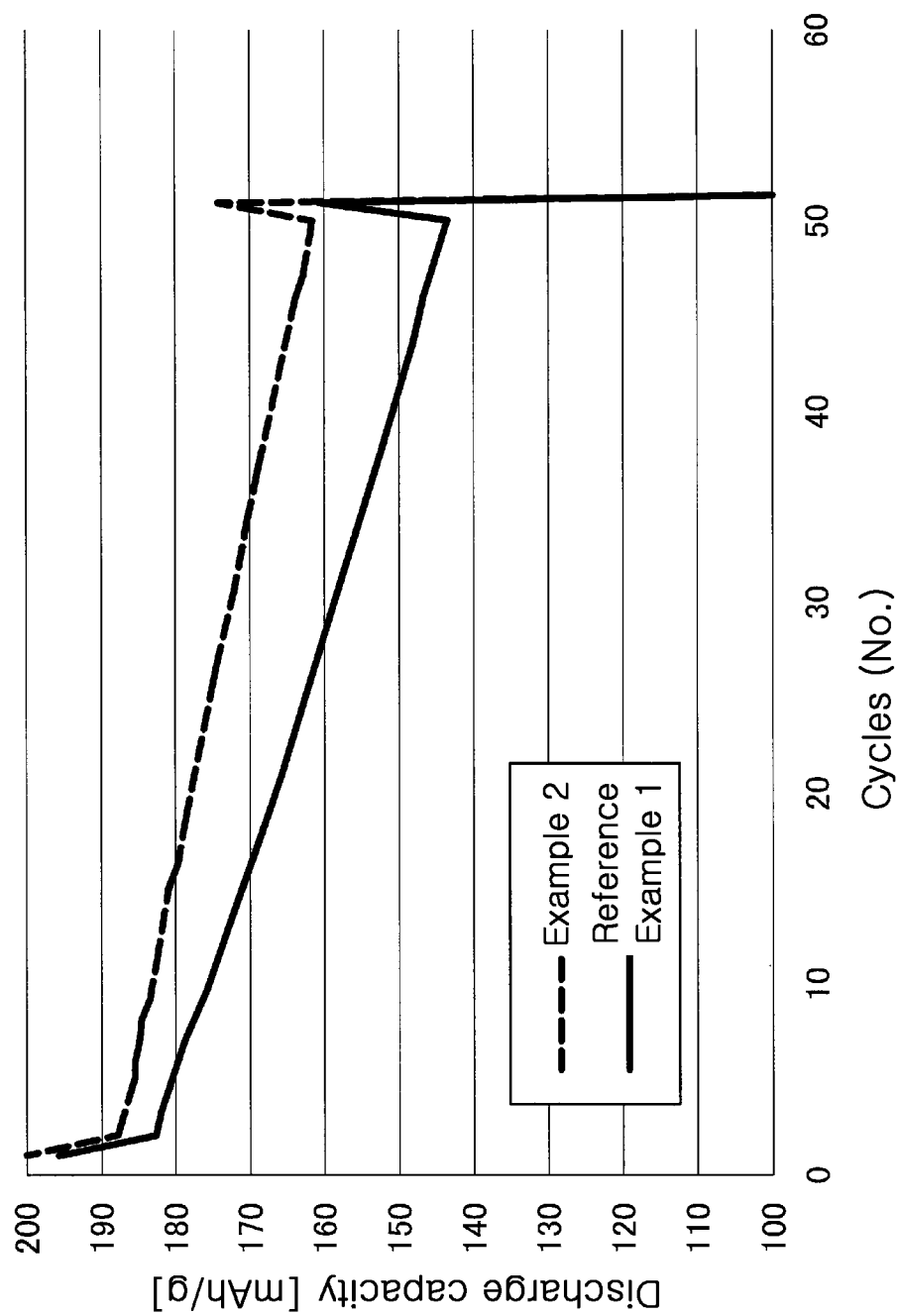
FIG. 7 is a graph showing the change in the discharge capacity depending on the charge and discharge cycles of rechargeable lithium battery cells according to Example 2 and Reference Example 1.

In addition, FIGS. 6 and 7 are graphs plotting changes in the discharge capacity of Examples 1 and 2, Comparative Example 1, and Reference Example 1 depending on a charge and discharge cycle.

FIG. 6 is a graph showing the change in the discharge capacity of the rechargeable lithium battery cells according to Example 1 and Comparative Example 1 depending on a charge and discharge cycle (as a function of the number of charge and discharge cycles), and FIG. 7 is a graph showing a change in the discharge capacity of the rechargeable lithium battery cells according to Example 2 and Reference Example 1 depending on a charge and discharge cycle.

Referring to FIG. 6, the cell utilizing a lithium nickel composite oxide fired under a high oxygen partial pressure according to Example 1 maintained the high discharge capacity despite the repeated charge and discharge cycles compared with the cell according to Comparative Example 1.

In addition, referring to FIG. 7, the cell utilizing a lithium nickel composite oxide fired under an oxygen partial pressure according to Example 2 maintained the high discharge capacity despite the repeated charge and discharge cycles compared with the cell according to Reference Example 1.

Accordingly, the lithium nickel composite oxides according to the examples had a diffraction peak intensity ratio $I_{(003)}/I_{(104)}$, a full width at half maximum $FWHM_{(003)}$, a full width at half maximum $FWHM_{(104)}$, and an average valence of transition metals within the ranges of one embodiment in the X-ray diffraction, and had improved cycle characteristics of lithium rechargeable battery cells.

Evaluation 3: Rate Capability

Each lithium nickel composite oxide according to Examples 1 and 2 and Comparative Examples 1 and 2, acetylene black, and polyvinylidene fluoride were mixed in a weight ratio of 95:2:3 and dispersed in N-methyl-2-pyrrolidone, thereby preparing a slurry. The slurry was coated on an aluminum foil and dried to form a positive active material layer, thus manufacturing a positive electrode.

A negative electrode was manufactured by coating a metal lithium film on a copper foil.

As for a separator, a 12 μm-thick porous polypropylene film was utilized.

The separator was disposed between the positive and negative electrodes, thereby forming an electrode structure.

Subsequently, the electrode structure was processed into a 2032 coin half-cell size and inserted into a coin half-cell container. Then, an electrolyte solution was prepared by mixing ethylene carbonate and dimethyl carbonate in a volume ratio of 3:7 to prepare a non-aqueous solvent, and dissolving hexafluorolithium phosphate ($LiPF_6$) in a concentration of 1.3 mol/L therein. Subsequently, the electrolyte solution was injected into the coin half-cell container and impregnated into the separator, thereby manufacturing a half-cell.

Rate capability of the rechargeable lithium battery cells according to Examples 1 and 2, Comparative Example 1, and Reference Example 1 was evaluated, and the results are provided in FIGS. 8 to 11.

For example, the cells were charged and discharged at a charge rate, a discharge rate. and a cut-off voltage as provided in Table 4.

On the other hand, in Table 4, CC-CV indicates a constant current/constant voltage charge, and CC indicates a constant current discharge. A cut-off voltage indicates a voltage when charge and discharge ended. For example, 4.3-2.8 under the column of Cut-off voltage indicates that a charge at the 1st cycle was performed up to 4.3 V to which a voltage of the rechargeable lithium battery was reached, and a discharge at the 1st cycle was performed down to 2.8 V to which a voltage of the rechargeable lithium battery was reached.

TABLE 4

| Test cycle | Charge rate | Discharge rate | Cut-off voltage [V] |
| --- | --- | --- | --- |
| 1 | 0.1 C CC-CV | 0.1 C CC | 4.3-2.8 |
| 2 | 0.2 C CC-CV | 0.2 C CC | 4.3-2.8 |
| 3 | 0.2 C CC-CV | 1.0 C CC | 4.3-2.8 |
| 4 | 0.2 C CC-CV | 2.0 C CC | 4.3-2.8 |
| 5 | 0.2 C CC-CV | 3.0 C CC | 4.3-2.8 |
| 6 | 0.2 C CC-CV | 5.0 C CC | 4.3-2.8 |

Figure 8:
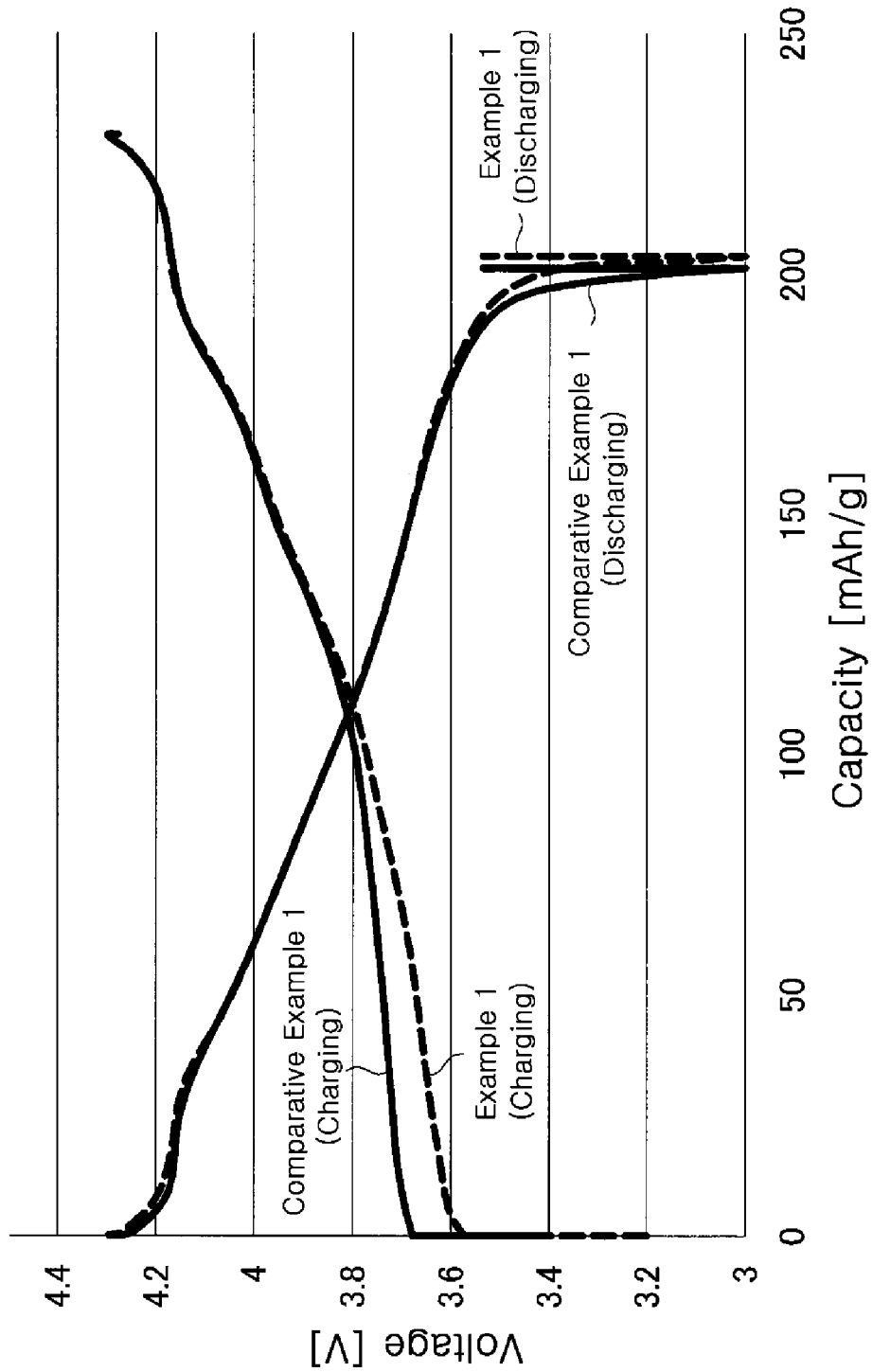
FIG. 8 is a graph showing the charge and discharge curves of the rechargeable lithium battery cells according to Example 1 and Comparative Example 1 at the 1st cycle.
Figure 9:
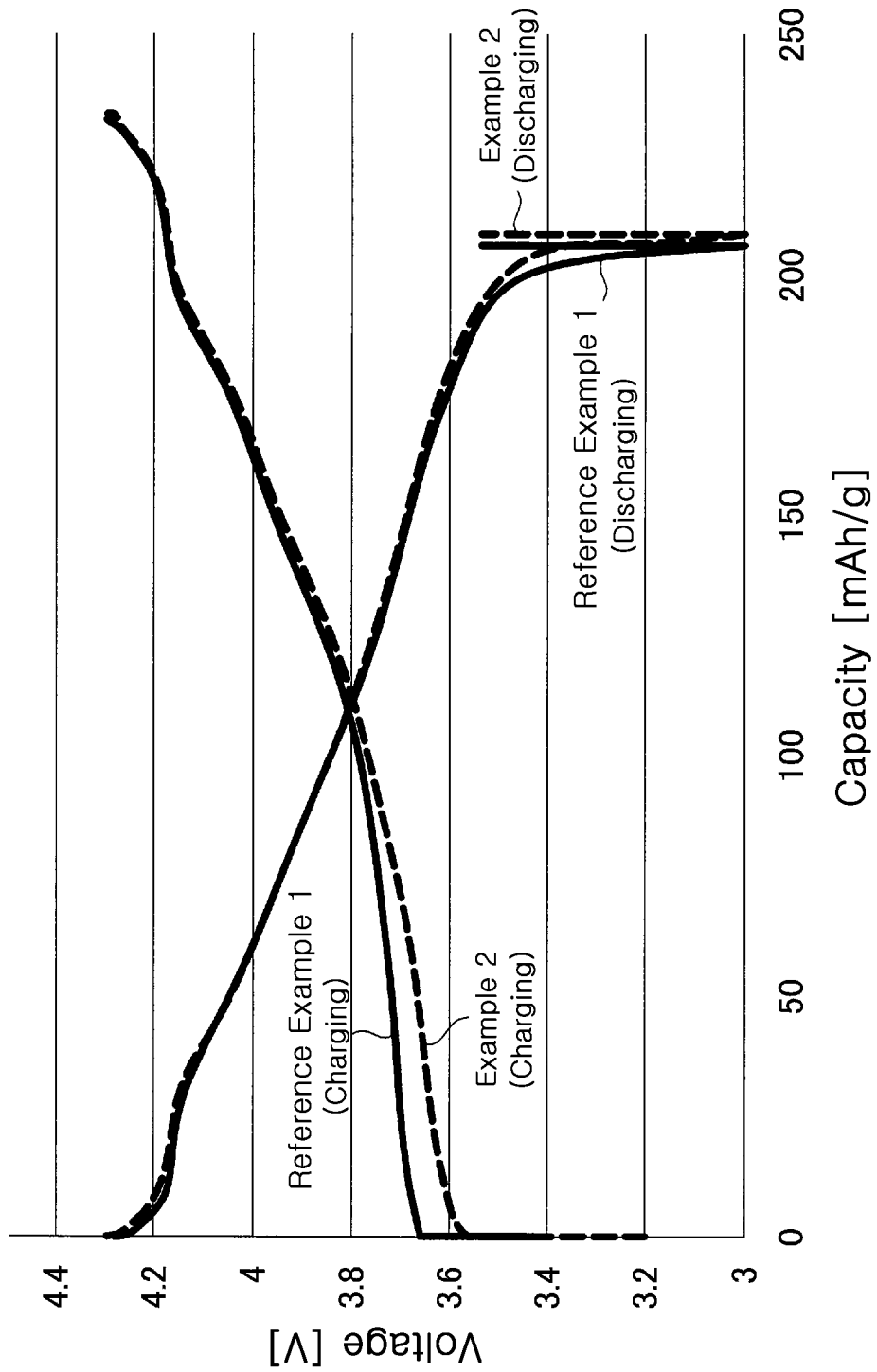
FIG. 9 is a graph showing the charge and discharge curves of the rechargeable lithium battery cells according to Example 2 and Reference Example 1 at the 1st cycle.

FIG. 8 is a graph showing the $1^{st}$ cycle charge and discharge curves of the rechargeable lithium battery cells according to Example 1 and Comparative Example 1, and FIG. 9 is a graph showing the $1^{st}$ cycle charge and discharge curves of the rechargeable lithium battery cells according to Example 2 and Reference Example 1.

Referring to FIG. 8, the cell of Example 1 was suppressed from having a voltage increase at the initial charge compared with the cell of Comparative Example 1 when charged at a charge rate of 0.1 C CC-CV and discharged at a discharge rate of 0.1 C CC for one cycle.

In addition, each charge capacity at a 0.1 C charge, discharge capacity at a 0.1 C discharge, and initial efficiency of Example 1 and Comparative Example 1 were measured, and the results are provided in Table 5.

On the other hand, initial efficiency was calculated by dividing the discharge capacity at a 0.1 C discharge by the charge capacity at a 0.1 C charge.

TABLE 5

| | Charge capacity at 0.1 C charge [mAh/g] | Discharge capacity at 0.1 C discharge [mAh/g] | Initial efficiency [%] |
| --- | --- | --- | --- |
| Example 1 | 229 | 204 | 89.1 |
| Comparative Example 1 | 230 | 202 | 87.6 |

Referring to Table 5, the cell utilizing a lithium nickel composite oxide fired under a high oxygen partial pressure according to Example 1 showed increased discharge capacity at the 0.1 C discharge compared with the cell of Comparative Example 1, and thus showed an increased initial efficiency.

In addition, referring to FIG. 9, when Example 2 and Reference Example 1 were charged at a charge rate of 0.1 C CC-CV and discharged at a discharge rate of 0.1 C CC, Example 2 was suppressed from having a voltage increase at the initial charge compared with Reference Example 1.

Charge capacity at the 0.1 C charge, discharge capacity at the 0.1 C discharge, and the initial efficiency of Example 2 and Comparative Example 2 were measured, and the results are provided in Table 6.

TABLE 6

|  | Charge capacity at 0.1 C charging [mAh/g] | Discharge capacity at 0.1 C discharging [mAh/g] | Initial efficiency [%] |
| --- | --- | --- | --- |
| Example 2 | 233 | 208 | 89.3 |
| Reference Example 1 | 232 | 206 | 88.5 |

Referring to Table 6, the cell utilizing a lithium nickel composite oxide fired under a high oxygen partial pressure according to Example 2 showed increased discharge capacity at the 0.1 C discharge and thus increased initial efficiency compared with the cell of Reference Example 1.

Figure 10:
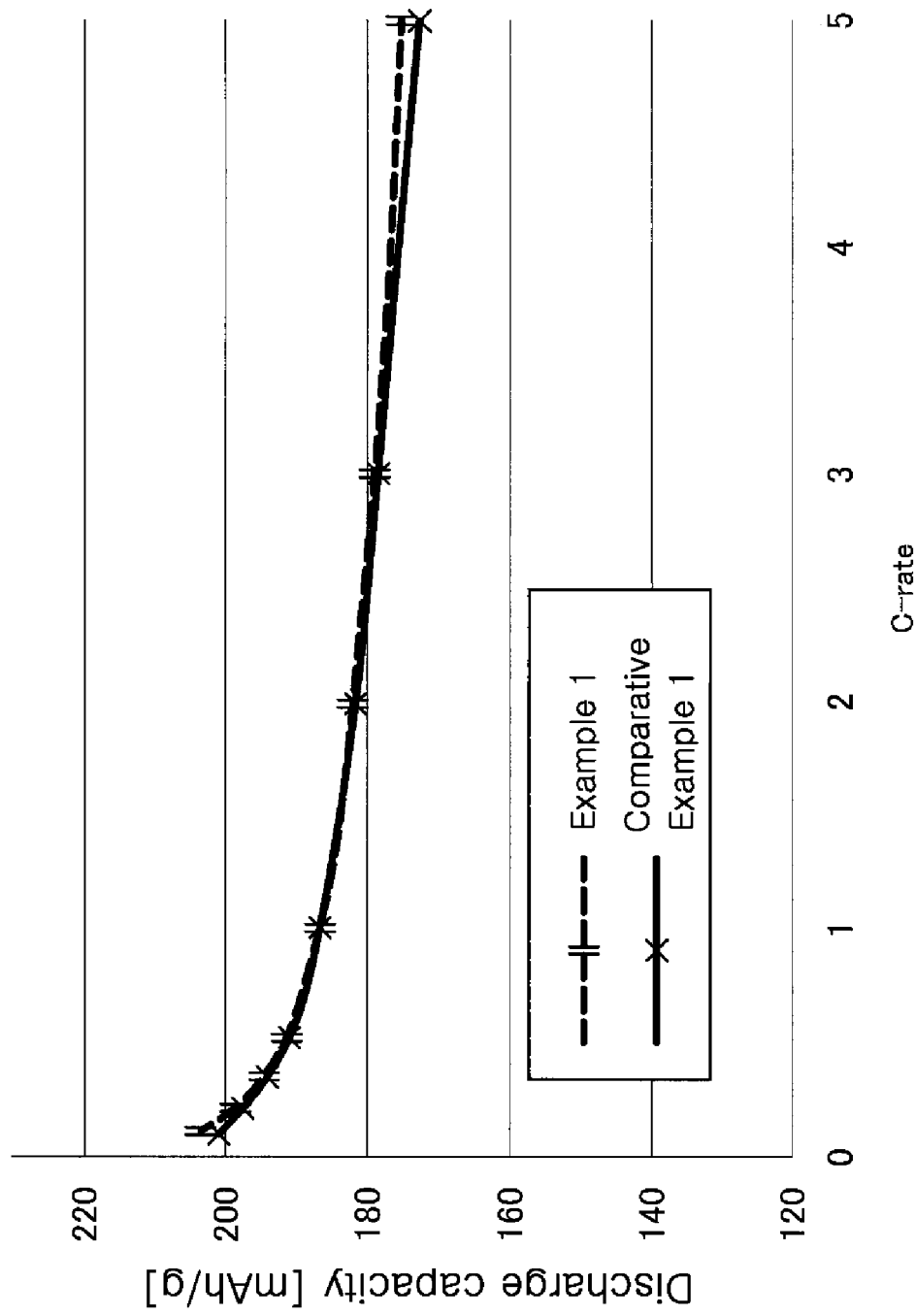
FIG. 10 is a graph showing the discharge capacity versus the discharge rates of the lithium battery cells according to Example 1 and Comparative Example 1.
Figure 11:
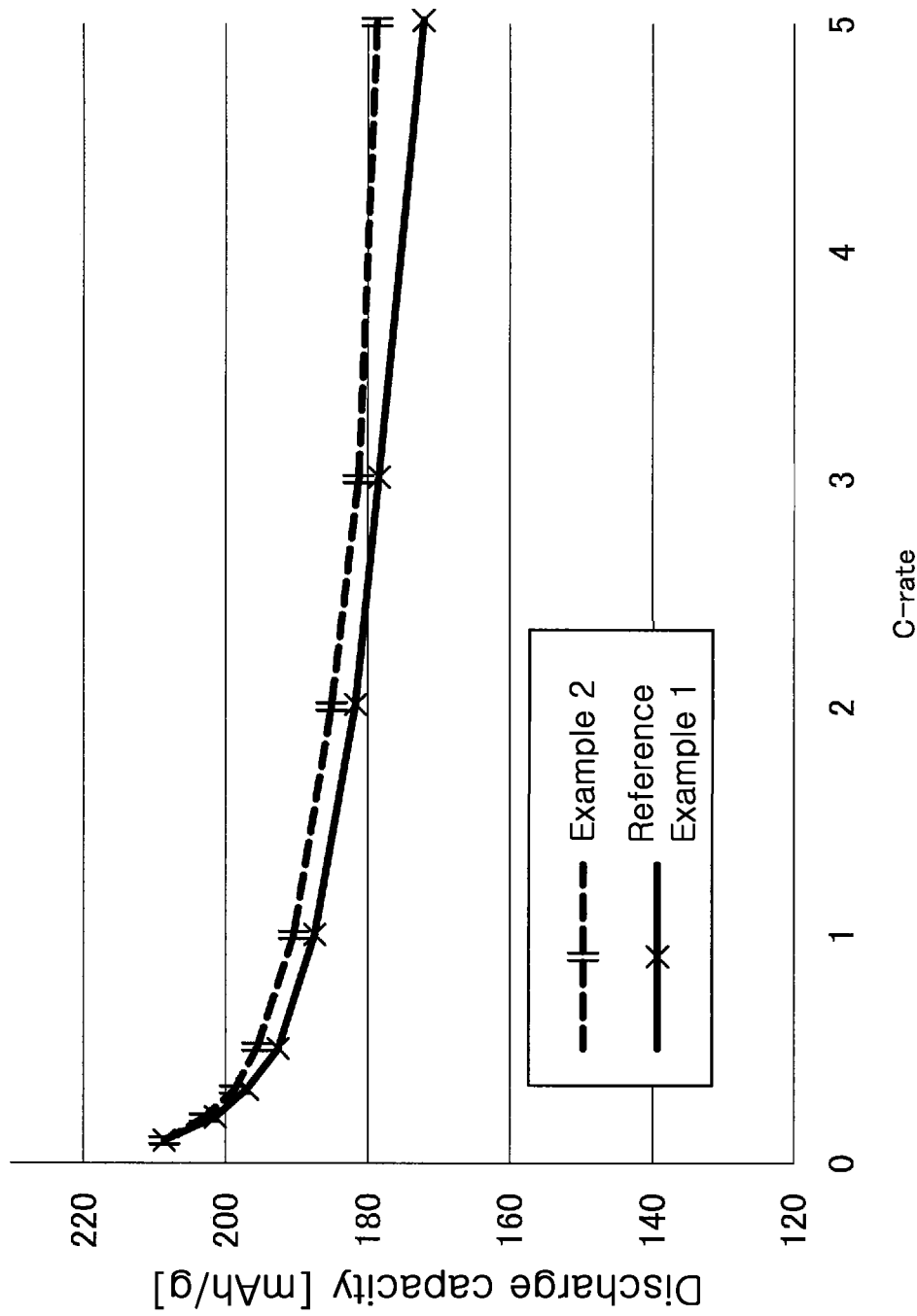
FIG. 11 is a graph showing the discharge capacity versus the discharge rates of the lithium battery cells according to Example 2 and Reference Example 1.

In addition, referring to FIGS. 10 and 11, the discharge capacity at each discharge rate is illustrated.

FIG. 10 is a graph showing the discharge capacity of the rechargeable lithium battery cells according to Example 1 and Comparative Example 1 at each discharge rate, and FIG. 11 is a graph showing the discharge capacity of the rechargeable lithium battery cells of Example 2 and Reference Example 1 at each discharge rate.

Referring to FIG. 10, Example 1 utilizing the lithium nickel composite oxide fired under a high oxygen partial pressure showed equivalent or higher discharge capacity than Comparative Example 1 at each discharge rate. For example, Example 1 had a ratio (obtained by dividing the discharge capacity at a discharge rate of 3.0 C by the discharge capacity at a discharge rate of 0.33 C) of 91.9%, while Comparative Example 1 had a ratio of 91.8%. Accordingly, Example 1 had almost an equivalent rate capability compared with Comparative Example 1.

Likewise, referring to FIG. 11, Example 2 utilizing lithium nickel composite oxide fired under a high oxygen partial pressure showed an equivalent or higher discharge capacity than Reference Example 1 at each discharge rate. For example, Example 2 had a ratio (obtained by dividing the discharge capacity at a discharge rate of 3.0 C by the discharge capacity at a discharge rate of 0.33 C) of 91.3%, while Reference Example 1 had a ratio of 90.7%. Accordingly, Example 2 had an almost equivalent rate capability to Reference Example 1.

Based on the above results, when a rechargeable lithium battery cell according to one embodiment utilized the lithium nickel composite oxide fired under a high oxygen partial pressure, having a diffraction peak intensity ratio $I_{(003)}/I_{(104)}$ of greater than or equal to 0.92 to less than or equal to 1.02, a full width at half maximum $FWHM_{(003)}$ of greater than or equal to 0.13 to less than or equal to 0.15, a full width at half maximum $FWHM_{(104)}$ of greater than or equal to 0.15 to less than or equal to 0.18, and an average valence of the transition metal of 2.9 in the X-ray diffraction as a positive active material, the rechargeable lithium battery cell showed improved cycle characteristics.

In addition, referring to Table 3, a rechargeable lithium battery cell according to one embodiment did not exhibit deteriorated discharge capacity but did exhibit improved cycle characteristics.

Furthermore, referring to the results of FIGS. 8 to 11, the rechargeable lithium battery cell according to one embodiment showed improved cycle characteristics without deterioration of other characteristics (such as the initial charge and discharge characteristics, rate capability, and/or the like).

According to one embodiment, cycle characteristics of a rechargeable lithium battery cell may be improved by improving the stability of a lithium nickel composite oxide including Ni at a ratio greater than or equal to 55%, for example, greater than or equal to 80%.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS 10 rechargeable lithium battery
20 positive electrode
21 current collector
22 positive active material layer
30 negative electrode
31 current collector
32 negative active material layer
40 separator layer

What is claimed is:

1. A positive active material for a rechargeable lithium battery, comprising
a lithium nickel composite oxide having a $I_{(003)}/I_{(104)}$ ratio of greater than or equal to about 0.92 and less than or equal to about 1.02 in X-ray diffraction, wherein the $I_{(003)}/I_{(104)}$ ratio is a ratio of a diffraction peak intensity $I_{(003)}$ of a (003) phase and a diffraction peak intensity $I_{(104)}$ of a (104) phase,
wherein the lithium nickel composite oxide comprises lithium and a nickel-containing metal,
wherein the lithium nickel composite oxide is represented by Chemical Formula 1:

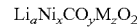   Chemical Formula 1

$$Li_aNi_xCo_yM_zO_2$$

wherein, M is at least one metal selected from aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce), and
$0.2 \leq a \leq 1.2$, $0.85 \leq x < 1$, $0 < y \leq 0.2$, $0 \leq z \leq$, and $x+y+z=1$,
wherein a full width at half maximum $FWHM_{(003)}$ of a diffraction peak at the (003) phase of the lithium nickel composite oxide in X-ray diffraction is greater than or equal to about 0.13 and less than or equal to about 0.15,
wherein the lithium nickel composite oxide has an average transition metal valence of greater than or equal to about 2.9 calculated from an analysis of an X-ray absorption fine structure (XAFS) or from a carbon, hydrogen, nitrogen, oxygen (CHNO) elemental analysis, and
wherein the lithium nickel composite oxide is produced by adding a saturated $NaCO_3$ aqueous solution to co-precipitate a carbonate salt of Ni, Co and M to provide a co-precipitated carbonate salt; mixing lithium hydroxide with the co-precipitated carbonate salt to provide a mixed powder, and conducting a single firing at about 750° C. to about 850° C. under an oxygen partial pressure of greater than about 0.1 MPa and less than about 0.5 MPa to provide the lithium nickel composite oxide.

2. The positive active material of claim 1, wherein, M is at least one metal selected from chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce), $0.2 \leq a \leq 1.2$, $0.85 \leq x < 1$, $0 < y \leq 0.2$, $0 \leq z \leq 0.1$, and $x+y+z=1$.

3. The positive active material of claim 1, wherein an average particle diameter of secondary particles of the lithium nickel composite oxide is greater than or equal to about 8 μm and less than or equal to about 25 μm.

4. The positive active material of claim 1, wherein the lithium nickel composite oxide is obtained by firing the mixed powder at an oxygen partial pressure of from 0.2 MPa to less than 0.5 MPa.

5. The positive active material of claim 1, wherein a full width at half maximum $FWHM_{(104)}$ of a diffraction peak at the (104) phase of the lithium nickel composite oxide in X-ray diffraction is greater than or equal to about 0.15 and less than or equal to about 0.18.

6. A rechargeable lithium battery comprising a positive electrode comprising the positive active material of claim 1.

7. The rechargeable lithium battery of claim 6, wherein the lithium nickel composite oxide is represented by Chemical Formula 1:

$$Li_aNi_xCo_yM_zO_2 \qquad \text{Chemical Formula 1}$$

wherein, M is at least one metal selected from aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce), $0.2 \leq a \leq 1.2$, $0.85 \leq x < 1$, $0 < y \leq 0.2$, $0 \leq z \leq 0.1$, and $x+y+z=1$.

8. The rechargeable lithium battery of claim 6, wherein an average particle diameter of secondary particles of the lithium nickel composite oxide is greater than or equal to about 8 μm and less than or equal to about 25 μm.

9. The rechargeable lithium battery of claim 6, wherein the lithium nickel composite oxide is obtained by firing a lithium nickel composite oxide precursor at an oxygen partial pressure of greater than about 0.1 MPa and less than about 0.5 MPa.

10. The rechargeable lithium battery of claim 6, wherein a full width at half maximum $FWHM_{(104)}$ of a diffraction peak at the (104) phase of the lithium nickel composite oxide in X-ray diffraction is greater than or equal to about 0.15 and less than or equal to about 0.18.

11. The rechargeable lithium battery of claim 6, wherein the lithium nickel composite oxide has an average transition metal valence of greater than or equal to about 2.9 calculated from an analysis of an X-ray absorption fine structure (XAFS) or from a carbon, hydrogen, nitrogen, oxygen (CHNO) elemental analysis.

12. The positive active material of claim 1, wherein, M is at least one metal selected from manganese (Mn), chromium (Cr), iron (Fe), vanadium (V), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

* * * * *